United States Patent
Martin et al.

(10) Patent No.: US 7,969,358 B2
(45) Date of Patent: Jun. 28, 2011

(54) COMPENSATION OF BEAMFORMING ERRORS IN A COMMUNICATIONS SYSTEM HAVING WIDELY SPACED ANTENNA ELEMENTS

(75) Inventors: G. Patrick Martin, Merritt Island, FL (US); Kathleen Minear, Palm Bay, FL (US); John Roach, Indialantic, FL (US); Allan V. Dianic, Melbourne, FL (US); William C. Adams, Jr., West Melbourne, FL (US); Lynda Margaret Ralston, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 377 days.

(21) Appl. No.: 12/273,760

(22) Filed: Nov. 19, 2008

(65) Prior Publication Data

US 2010/0123625 A1 May 20, 2010

(51) Int. Cl.
*H01Q 3/26* (2006.01)
*H01Q 3/34* (2006.01)
(52) U.S. Cl. .................. 342/368; 342/376; 342/377
(58) Field of Classification Search .............. 342/368, 342/372, 376, 377
See application file for complete search history.

(56) References Cited

U.S. PATENT DOCUMENTS

| | | | | |
|---|---|---|---|---|
| 3,646,558 A * | 2/1972 | Campanella | ............ | 342/373 |
| 3,697,997 A | 10/1972 | Cooper | | |
| 3,961,172 A | 6/1976 | Hutcheon | | |
| 4,060,809 A | 11/1977 | Baghdady | | |
| 4,358,822 A | 11/1982 | Sanchez | | |
| 4,532,518 A * | 7/1985 | Gaglione et al. | ............ | 342/372 |
| 4,843,397 A * | 6/1989 | Galati et al. | ............ | 342/59 |
| 4,862,180 A | 8/1989 | Martin | | |
| 5,008,680 A * | 4/1991 | Willey et al. | ............ | 342/372 |
| 5,157,404 A * | 10/1992 | Rowe et al. | ............ | 342/372 |
| 5,315,308 A | 5/1994 | Nehoria et al. | | |
| 5,541,607 A * | 7/1996 | Reinhardt | ............ | 342/372 |
| 5,805,983 A * | 9/1998 | Naidu et al. | ............ | 455/67.16 |
| 6,002,360 A * | 12/1999 | Wolcott et al. | ............ | 342/354 |
| 6,075,484 A | 6/2000 | Daniel et al. | | |
| 6,480,153 B1 * | 11/2002 | Jung et al. | ............ | 342/368 |

(Continued)

FOREIGN PATENT DOCUMENTS

EP 0 959 522 A1 11/1999

(Continued)

OTHER PUBLICATIONS

Li, Y., et al., "Adaptive Blind Source Separation and Equalization for Multiple-Input/Multiple-Output Systems" IEEE Transactions on Information Theory, vol. 44, No. 7, Nov. 1998.

(Continued)

*Primary Examiner* — Gregory C Issing
(74) *Attorney, Agent, or Firm* — Fox Rothschild, LLP; Robert J. Sacco

(57) ABSTRACT

Systems and methods for operating a communications system. The methods involve computing one or more complex weights to be applied to transmit signals and receive signals by beamformers. The complex weights are based at least on configuration data for the communications system. The methods also involve applying a first plurality of weight corrections to the complex weights based on phasing errors occurring in a communication path inclusive of a control system and antenna elements. The methods further involve applying a second plurality of weight corrections to the complex weights based on phase differences at the antenna elements relative to a reference location for the receive signals.

18 Claims, 19 Drawing Sheets

U.S. PATENT DOCUMENTS

| | | | |
|---|---|---|---|
| 6,597,730 B1 * | 7/2003 | Bader | 375/219 |
| 6,816,822 B1 | 11/2004 | Hess et al. | |
| 6,826,521 B1 | 11/2004 | Hess et al. | |
| 6,861,975 B1 * | 3/2005 | Coleman, Jr. et al. | 342/174 |
| 6,897,807 B2 | 5/2005 | Kishigami et al. | |
| 6,975,268 B2 * | 12/2005 | Coleman et al. | 342/375 |
| 7,057,555 B2 * | 6/2006 | Lewis | 342/372 |
| 7,705,779 B2 | 4/2010 | Goldberg et al. | |
| 2002/0126045 A1 | 9/2002 | Kishigami et al. | |
| 2002/0196186 A1 | 12/2002 | Holt et al. | |
| 2003/0236081 A1 | 12/2003 | Braun | |
| 2004/0169602 A1 | 9/2004 | Hamada et al. | |
| 2006/0109927 A1 | 5/2006 | Magee et al. | |
| 2007/0078530 A1 | 4/2007 | Blevins et al. | |
| 2007/0168057 A1 | 7/2007 | Blevins et al. | |
| 2008/0129613 A1 | 6/2008 | Ermutlu et al. | |
| 2009/0167607 A1 | 7/2009 | Holder | |
| 2010/0123618 A1 | 5/2010 | Martin et al. | |
| 2010/0124895 A1 | 5/2010 | Martin et al. | |
| 2010/0125347 A1 | 5/2010 | Martin et al. | |

FOREIGN PATENT DOCUMENTS

| | | |
|---|---|---|
| EP | 1 271 802 A1 | 1/2003 |
| WO | WO 01/65637 A2 | 9/2001 |
| WO | WO 2007/001252 A1 | 1/2007 |
| WO | WO 2008/074925 A1 | 6/2008 |

OTHER PUBLICATIONS

Qin, S., et al., "A Survey of Industrial Model Predictive Control Technology" Control Engineering Practice, Pergamon Press, Oxford, GB, vol. 11, Jan. 1, 2003, pp. 733-764.

Maneri, E., et al., "LQG Controller Design Using GUI: Application to Antennas and Radio-Telescopes" IS Transactions, Instrument Society of America, Pittsburgh, US, vol. 39, No. 2, Apr. 1, 2000, pp. 243-264.

Gawronski, W., Control and Pointing Challenges of Large Antennas and Telescopes: IEEE Transactions on Control Systems Technology, IEEE Service Center, New York, NY, US, vol. 15, No. 2, Mar. 1, 2007, pp. 276-289.

International Preliminary Report on Patentability, dated Feb. 23, 2011 which issued during the prosecution of International Application No. PCT/US2009/064942.

* cited by examiner

COMPENSATION OF BEAMFORMING ERRORS IN A COMMUNICATIONS SYSTEM HAVING WIDELY SPACED ANTENNA ELEMENTS

BACKGROUND OF THE INVENTION

1. Statement of the Technical Field

The invention concerns communications system. More particularly, the invention concerns systems and methods for compensation of beamforming errors in a communications system having widely spaced antenna elements.

2. Description of the Related Art

Multiple element antenna arrays are widely used in wireless communications systems to enhance the transmission and reception of signals. In particular, the enhanced performance is generally provided by using such antenna arrays in conjunction with beamforming techniques. Conventional beamforming takes advantage of interference between electromagnetic waves generated by each of the different antenna elements in the antenna array to change the overall directionality for the array. For example, during transmission, the phase and relative amplitude of the transmitted signal at each antenna element is adjusted, in order to create a desired pattern of constructive and destructive interference at the wavefront of the transmitted signal. During signal reception, the received signals are processed and the different antenna elements are arranged in such a way that a pre-defined pattern of radiation is preferentially observed by the antenna elements.

In general, such antenna arrays typically include a system controller, a plurality of antenna controllers, and a plurality of antenna elements (e.g., dish antennas). Each of the antenna elements is typically communicatively coupled to the system controller and a respective one of the antenna controllers via cables. During transmission and reception, each antenna element converts electrical signals into electromagnetic waves and vice versa. The system controller, using conventional beamforming techniques, varies the configuration of the various components in the antenna array to provide a particular radiation pattern during transmission or reception. However, as the dimensions of the array, the number of antenna elements, and the precision required in certain beamforming applications increases, properly concerting the actions of the various components becomes increasingly difficult.

SUMMARY OF THE INVENTION

Embodiments of the present invention systems and methods for operating a communications system. The methods generally involve computing one or more complex weights to be applied to transmit signals and receive signals by beamformers. The complex weights are based at least on configuration data for the communications system. The methods also generally involve applying a first plurality of weight corrections to the complex weights based on phasing errors occurring in a communication path inclusive of a control system and antenna elements. The methods further generally involve applying a second plurality of weight corrections to the complex weights based on phase differences at the antenna elements relative to a reference location for the receive signals.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
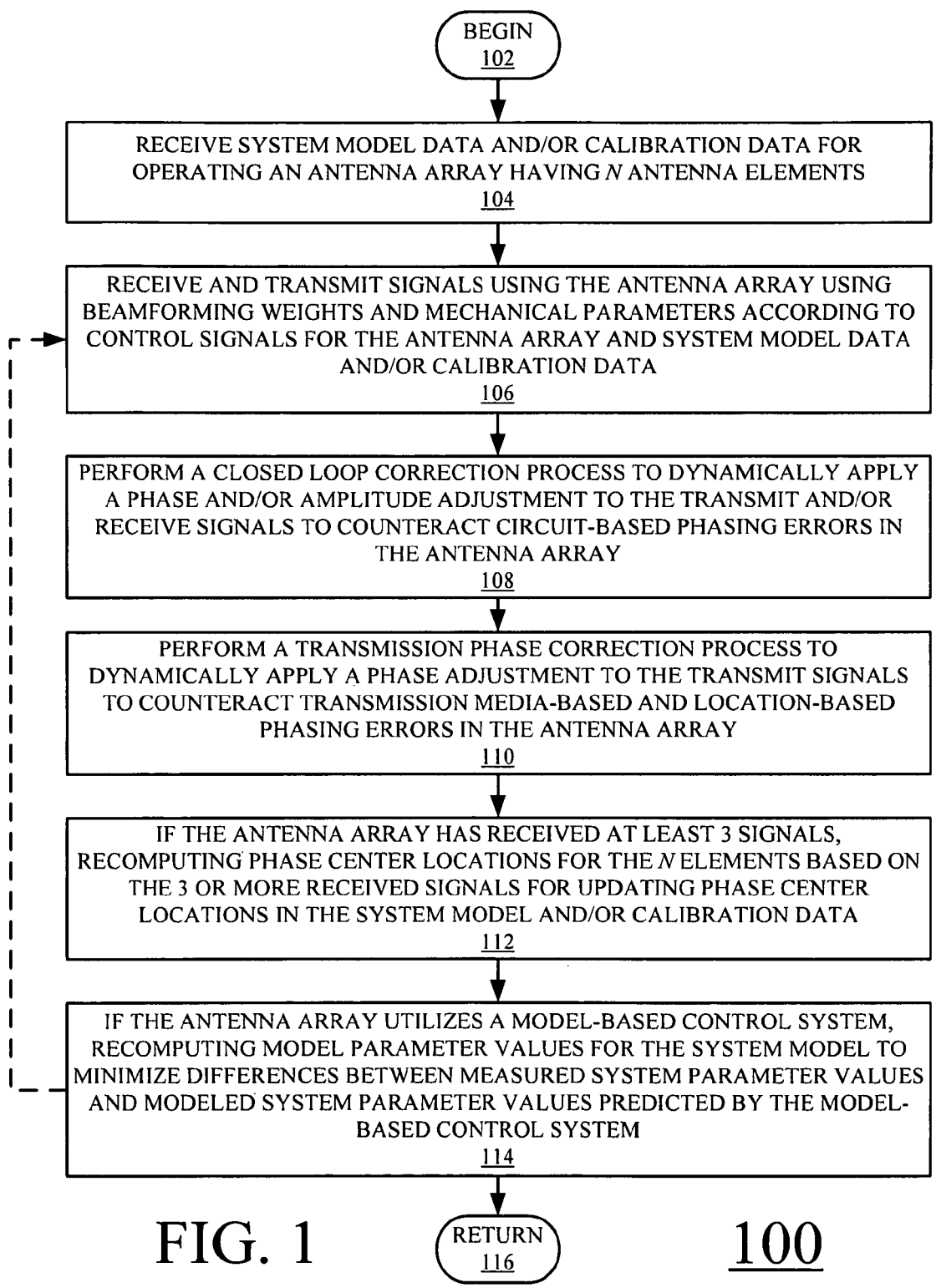
FIG. 1 is a flowchart of steps in an exemplary method for operating an array of antenna elements according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Multi-element antenna arrays are commonly used for providing directional wireless communications by utilizing various beamforming techniques. Typically, the beamforming is performed by using a system model and/or calibration data describing the configuration of the array to determine how to adjust the antenna elements to provide transmission and reception of signals from one or more sources. However, one of the difficulties with beamforming techniques is that system models and calibration data describing the array are typically limited in accuracy. That is, even though the locations of the elements may be well known, the phase centers of the antenna elements may only be estimated or may vary over time. A "phase center", as used herein with respect to an antenna element, refers to the point from which the electromagnetic radiation generated by the antenna element spreads spherically outward, with the phase of the signal being equal at any point on the sphere. As a result, if phase center information is inaccurate, incorrect interference patterns will be generated during beamforming, resulting in reduced signal strength during reception or misalignment during transmission. These difficulties are further exacerbated as the size of the array is increased and the distance to the object of interest is increased. Furthermore, hardware and environmentally induced delays and phasing error (e.g., due to heating) can further modify the location of the phase center of an antenna element. Therefore, increased accuracy of the system model and/or the calibration data is required to provide proper beamforming and more reliable communications.

As a result, in order to determine the amount of transmission phasing errors, so-called "long loop" methods are typically used. That is, an antenna element is configured to transmit an initial signal towards a reference object, which will produce a return signal directed back towards the antenna element. Afterwards, based on the time elapsed between transmission of the initial signal, reception of the return signal, and known delays at the reference object, the phase center location for the antenna element can be ascertained. However, such methods are not without problems. First, signal latency can result in a time consuming calibration process. For example, if calibration data is being obtained between somewhat distant objects, such as Earth and Mars, the elapsed time between transmission and reception can be at least on the order of tens of minutes. If such a task is performed individually for a large array of multiple antenna elements, a calibration process can take hours, if not days. Second, even if closer reference objects are utilized to minimize signal latency, visibility is still generally an issue. For example, if the calibration data is acquired using signals transmitted between the Earth and the Moon, availability is a problem. In particular, since the Moon is available for approximately only 12 hours a day, calibrations can only be performed during limited time windows. Third, even if the reference object is available 24 hours a day, off-task alignment is an issue. That is, since the reference object may not be in the direction of the object of interest for the antenna array, the antenna array will generally need to terminate a current task and go into a calibration mode that points the antenna array away from the object of interest. As a result, the antenna array is generally unavailable for communications and/or measurement tasks during this calibration mode.

To overcome the limitations of conventional communications systems, embodiments of the present invention provide systems and methods for correcting or compensating for phasing errors due to variations in hardware operation, installation, and transmission and reception conditions. One aspect of the present invention provides for dynamic adjustment of the phase and/or amplitude of signals during beamforming to compensate for the phasing errors. Another aspect of the present invention provides for improved methods for updating data for the control system of the communications system, by generating or updating calibration data or simulation model data being used by the control system. In particular, embodiments of the present invention provide for correction of phasing errors due to circuit delays during operation of the communications system, correction of phasing errors due to errors in element placement or transmission conditions, generation of accurate phase center locations, and/or using model-based calibration methods for improving operation of the control system. The overall operation of a communications system configured according to an embodiment of the present invention is conceptually illustrated with respect to FIG. 1.

FIG. 1 is a flowchart of steps in an exemplary method 100 for operating an array of two or more spaced antenna elements according to an embodiment of the present invention. Method 100 can begin with step 102 and continues on to step 104. In step 104, the communications system, and particularly the control system, receives calibration data or simulation model data for operating the N antenna elements. The type of data received depends on whether a calibration data-based or a model-based control system is implemented. In the case of calibration data-based control systems, calibration data, comprising a table of a plurality of measurements and associated control signal values for the operation of interest, is provided to allow the control system to lookup how to respond to a control signal from a user. In the case of model-based control systems, a computer simulation model and values for the model parameters for evaluating the computer simulation model are provided to allow the control system to calculate input signals for the communications system based on a control signal from a user.

Once the system model data and/or the calibration data is received in step 104, the communications system can receive and transmit signals at step 106. At step 106, as described above, the control system generates beamforming weights for the antenna elements and control signals for adjusting any mechanical parameters for the antenna elements. These values can be based, as previously described, on the calibration data and/or system model data provided in step 104. Operation of the antenna elements with respect to beamforming weights will be described below with respect to FIGS. 2-5.

Subsequently or in combination with step 106, a closed loop correction process can be performed at step 108. During step 108, a phase and/or amplitude adjustment can be applied to the current transmit or receive signals to compensate for circuit-based phasing errors. For example, such phasing errors can occur as a result of variations in the operation of the components in the communications system. Such phasing errors can also occur as a result of variations in component performance due to external factors, such as temperature. Details of the closed loop correction process will be described below with respect to FIGS. 6-9, 10A, and 10B.

Subsequently or in combination with step 108, a transmission phase correction process can be performed at step 110. During step 110, delays in received signals can be used to calculate a phase adjustment to apply to the current transmit signals to compensate for variations in element location and transmission conditions. For example, phasing errors can occur as a result of variations in location of each element as compared to that specified in the calibration data or system model data. Such phasing errors can also occur as a result of environment conditions (such as atmospheric effects) impacting each of the antenna elements. In the various embodiments of the present invention, these adjustments can take the form of an adjustment of the beamforming weights generated at step 106. Details of the transmission phase correction process will be described below with respect to FIGS. 11A-11B, 12A-12C, and 13.

Also in combination with steps 108 and 110, phase center locations can be updated in the calibration data or the system model data at step 112, provided a sufficient number of observations or signals have been received by the communications system. During step 112, the phase center locations can be computed using at least 3 observations from different angles of arrival. As a result, the improved phase center locations allow more accurate control of the transmission and reception during step 106. Details of the calculation of the phase center locations will be described below with respect to FIGS. 11A-11B, 12A-12C, and 14.

Furthermore, in combination with steps 108, 110, or 112, a model-based calibration process can be used at step 114 to generate updated model parameter values if a model-based control system is used at step 106. During step 114, the model parameter values for the computer simulation model being used by the control system of the communication system can be adjusted to improve agreement between system parameter values calculated from output signal generated by the communications system or measurements performed in or around the communications system. As a result, the adjusted model parameters allow more accurate modeling of the communications system and therefore more accurate control of transmission and reception during step 106. Details of the model-based calibration process will be described below with respect to FIGS. 15-17.

Exemplary Communications System

Figure 2:
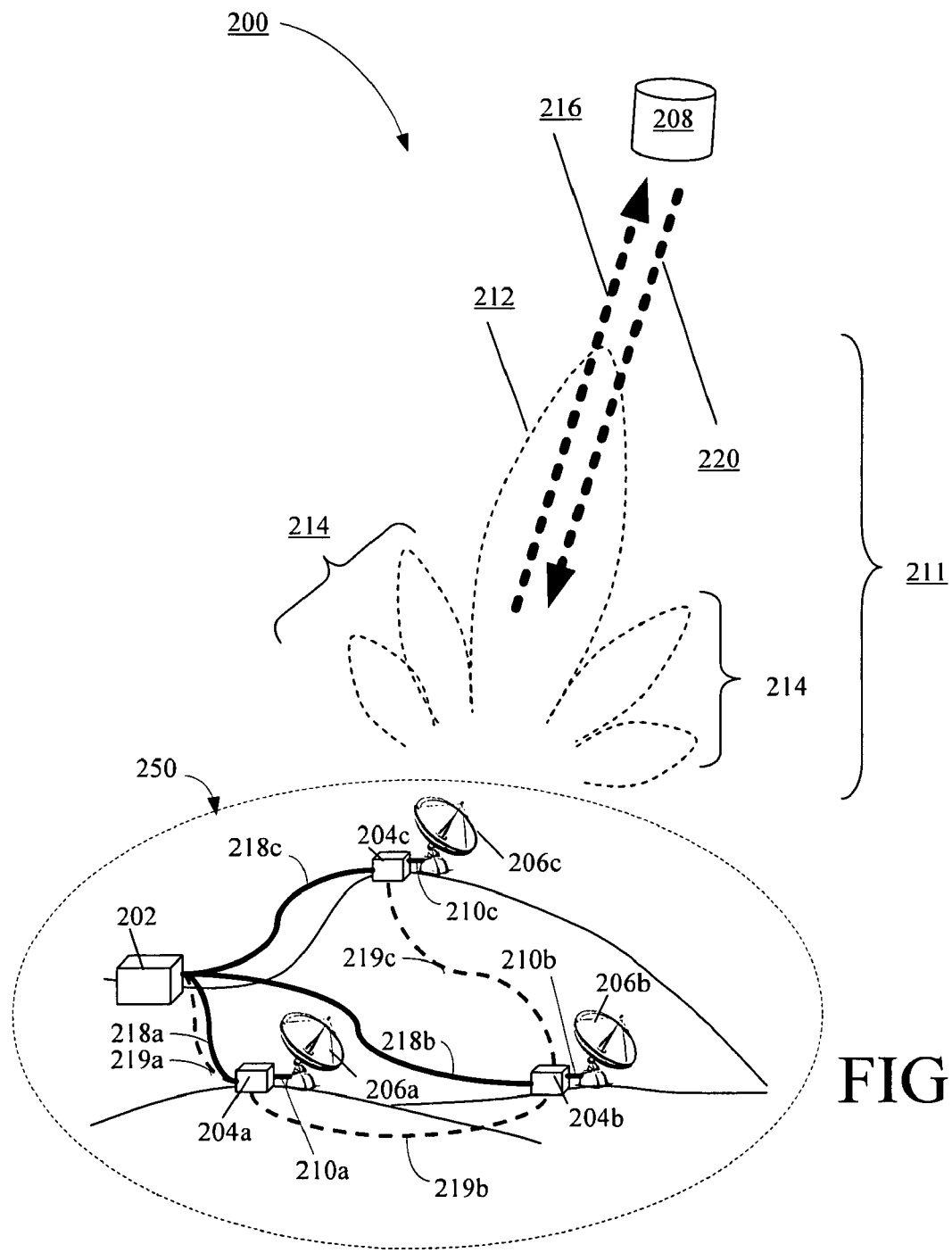
FIG. 2 is a schematic illustration of an exemplary communications system configured according to an embodiment of the present invention.

FIG. 2 shows an exemplary communications system 200 configured according to an embodiment of the present invention. As shown in FIG. 2, the communication system 200 comprises a multi-element antenna system (MEAS) 250 for transmitting signals to and receiving signals from at least one object of interest 208 remotely located from the multi-element antenna system. In FIG. 2, the object of interest 208 is shown as airborne or space borne object, such as an aircraft, spacecraft, a natural or artificial satellite, or a celestial object (e.g., planets, moons, asteroids, comets, etc. . . . ). However, the present invention is not limited in this regard and the MEAS 250 can also be used for transmitting and receiving signals from an object of interest 208 that is not airborne or space borne but is still remotely located with respect the MEAS 250. For example, a ground-based MEAS 250 can be used to provide communications with objects of interest 208 at other ground-based or sea-based locations.

The MEAS 250 can generally include an array control system (ACS) 202 for controlling the operation of multiple antenna elements. In the exemplary system 200, the ACS 202 can include model-based calibration system for controlling operation of the MEAS 250, as described below in FIG. 5.

In FIG. 2, the ACS 202 is shown as controlling the operation of antenna elements 206a, 206b, 206c and associated RF equipment 204a, 204b, 204c. The antenna elements 206a, 206b, 206c provide wireless communications. For example, if the MEAS 250 is in a transmit mode, then each antenna element 206a, 206b, 206c converts electrical signals into electromagnetic waves. The radiation pattern 211 resulting from the interference of the electromagnetic waves transmitted by the different antenna elements 206a, 206b, 206c can then be adjusted to provide a central beam 212 in the radiation pattern 211 aimed in a direction 216 of the object of interest 208. The radiation pattern 211 of the antenna elements 206a, 206b, 206c also generates smaller side beams (or side lobes) 214 pointing in other directions with respect the direction of the central beam 212. However, because of the relative difference in magnitude between the side beams 214 and the central beam 212, the radiation pattern preferentially transmits the signal in the direction of the central beam 212. Therefore, by varying the phases and the amplitudes of the signals transmitted by each of antenna elements 206a, 206b, and 206c, the magnitude and direction of the central beam 212 can be adjusted. If the MEAS 250 is in a receive mode, then each of antenna elements 206a, 206b, and 206c captures energy from passing waves propagated over transmission media (e.g., air or space) in the direction 220 and converts the captured energy to electrical signals. In the receive mode, the MEAS 250 can be configured to combined the electrical signals according to the radiation pattern 211 to improve reception from direction 220, as described below.

In FIG. 2, the antenna elements 206a, 206b, and 206c are shown as reflector-type (e.g., dish) antenna elements, which generally allow adjustment of azimuth (i.e., lateral or side-to-side angle) and elevation (angle with respect to a local horizontal reference plane). Therefore, in addition to adjustment of phase and amplitude of the signal transmitted by each of antenna elements 206a, 206b, 206c, the azimuth and elevation of each of antenna elements 206a, 206b, and 206c can also be used to further steer the central beam 212 and to further adjust the radiation pattern 211. However, the present invention is not limited in this regard and antenna elements 206a, 206b, 206c can comprise either directional or omni-directional antenna elements.

Although three (3) antenna elements 206a, 206b, 206c are shown in FIG. 2, the various embodiments of the present invention are not limited in this regard. Any number of antenna elements can be used without limitation. Furthermore, the spacing between the antenna elements 206a, 206b, and 206c with respect to each other can vary. Accordingly, the antenna elements 206a, 206b, and 206c can be widely or closely spaced to form an MEAS 250 that has a width of up to several kilometers. The antenna elements 206a, 206b, 206c can also be regularly spaced (not shown) with respect to one another to form a two dimensional (2D) grid of antenna elements or arbitrarily spaced (or non-linearly spaced) with respect to one another (as shown in FIG. 2) to form a three dimensional (3D) irregular array of antenna elements. As shown in FIG. 2, an arbitrary spacing for the antenna elements 206a, 206b, 206c can include providing varying elevation as well as varying lateral spacing between the antenna elements 206a, 206b, 206c.

As shown in FIG. 2, each of antenna elements 206a, 206b, 206c is communicatively coupled to a respective RF equipment 204a, 204b, 204c via a respective cable assembly 210a, 210b, 210c (collectively 210). Each of the cable assemblies 210a, 210b, 210c can have the same or different lengths. As used herein, the term "cable assemblies" refers to any number of cables provided for interconnecting two different components. In the various embodiments of the present invention, the cables in the cable assemblies 210a, 210b, 210c can be bundled or unbundled.

The RF equipment 204a, 204b, 204c control the antenna elements 206a, 206b, 206c, respectively. For example, the RF equipment 204a, 204b, 204c can include hardware entities for processing transmit signals and receive signals. The RF equipment 204a, 204b, 204c will be described in more detail below in relation to FIGS. 6-4. Additionally, for directional antenna elements, as shown in FIG. 2, the RF equipment 204a, 204b, 204c can be configured to provide control signals for control antenna motors (not shown), antenna servo motors (not shown), and antenna rotators (not shown) in antenna elements 206a, 206b, 206c to provide, for example, azimuth and elevation control.

As shown in FIG. 2, each of the RF equipment 204a, 204b, and 204c is communicatively coupled to the ACS 202 via a respective communications links 218a, 218b, 218c. Generally such communications links are provided via a cable assembly, however the present invention is not limited in this regard. In the various embodiments of the present invention, communications links 218a, 218b, 218c can comprise wire line, optical, or wireless communications links. The cable assemblies for the communications links 218a, 218b, 218c can have the same or different lengths. Furthermore, although the communications links 218a, 218b, and 218c are shown to be arranged to couple the RF equipment 204a, 204b, 204c to the ACS 202 in parallel, in other embodiments of the present invention, they can be connected in a series arrangement, such as that shown by communications links 219a, 219b, and 219c.

In operation, the ACS 202 modulates signals to be transmitted by the antenna elements 206a, 206b, 206c. The ACS 202 also demodulates signals received from other antenna systems. The ACS 202 further controls beam steering. The ACS 202 will be described in more detail below in relation to FIGS. 5-7.

Figure 3:
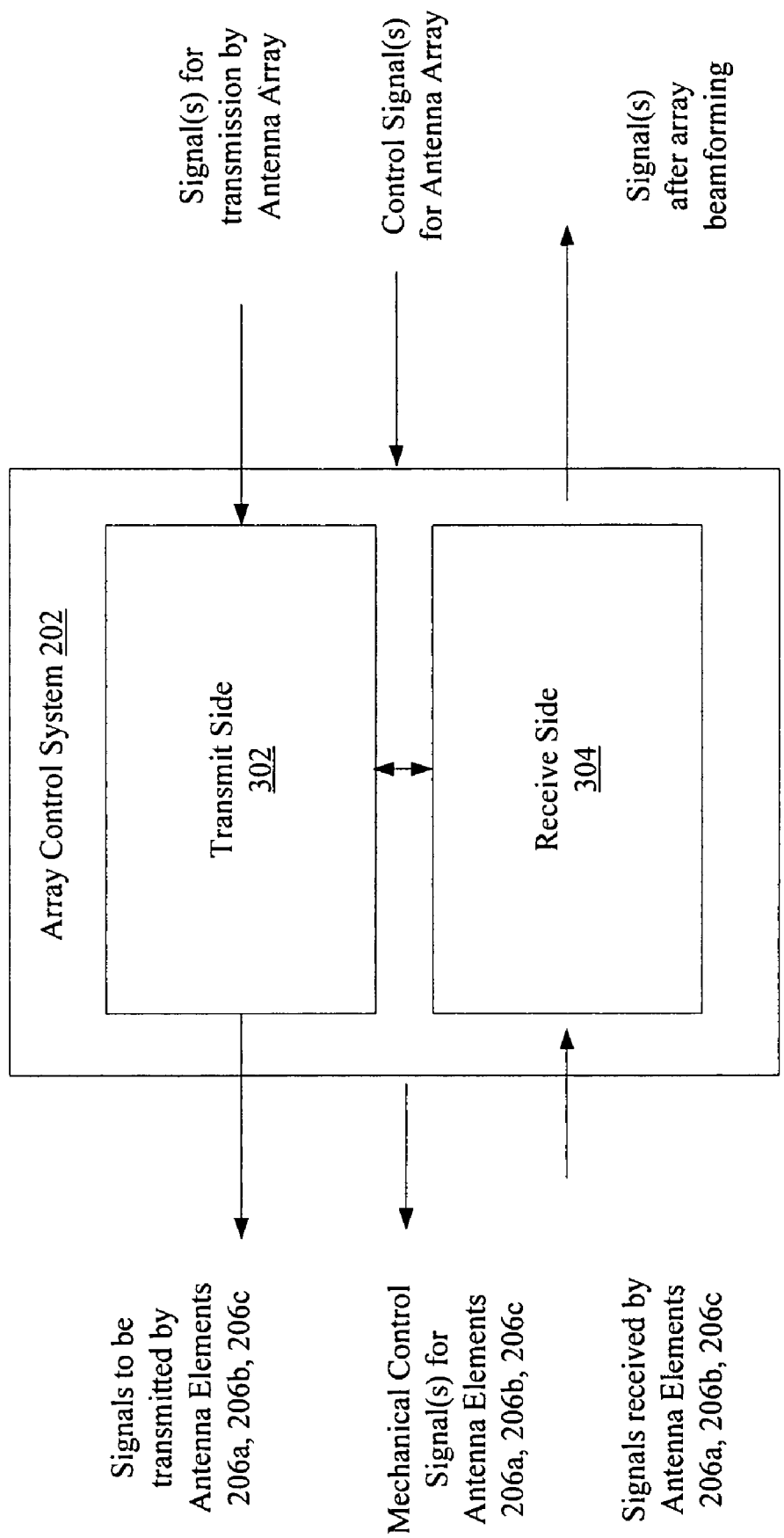
FIG. 3 is a block diagram of the array control system shown in FIG. 2.

Referring now to FIG. 3, there is provided a more detailed block diagram of the ACS 202 in FIG. 2. As shown in FIG. 3, the ACS 202 includes a transmit side 302 and a receive side 304. The ACS 202 is configured to manage both transmission and reception operations of the MEAS 250 based on signals for transmission and control signals. In particular, the transmit side 302 can generate signals to be transmitted by the RF equipment 204a, 204b, 204c via antenna elements 206a, 206b, 206c. Additionally or alternatively, the transmit side 302 can receive one or more signals from one or more signal generators (not shown) or receive external control signals. The transmit side 302 is also configured for modulating each of the generated or received signals and communicating the modulated signals to the RF equipment 204a, 204b, 204c for transmission. The transmit side 302 will be described in more detail below in relation to FIG. 4.

The receive side 304 is configured for receiving electrical signals generated by the RF equipment 204a, 204b, 204c based on the energy captured by the antenna elements 206a, 206b, 206c from passing waves. The receive side 304 is also configured for demodulating the electrical signal and communicating the demodulated electrical signal to an output device (not shown). The receive side 304 will be described below in more detail in relation to FIG. 5.

Figure 4:
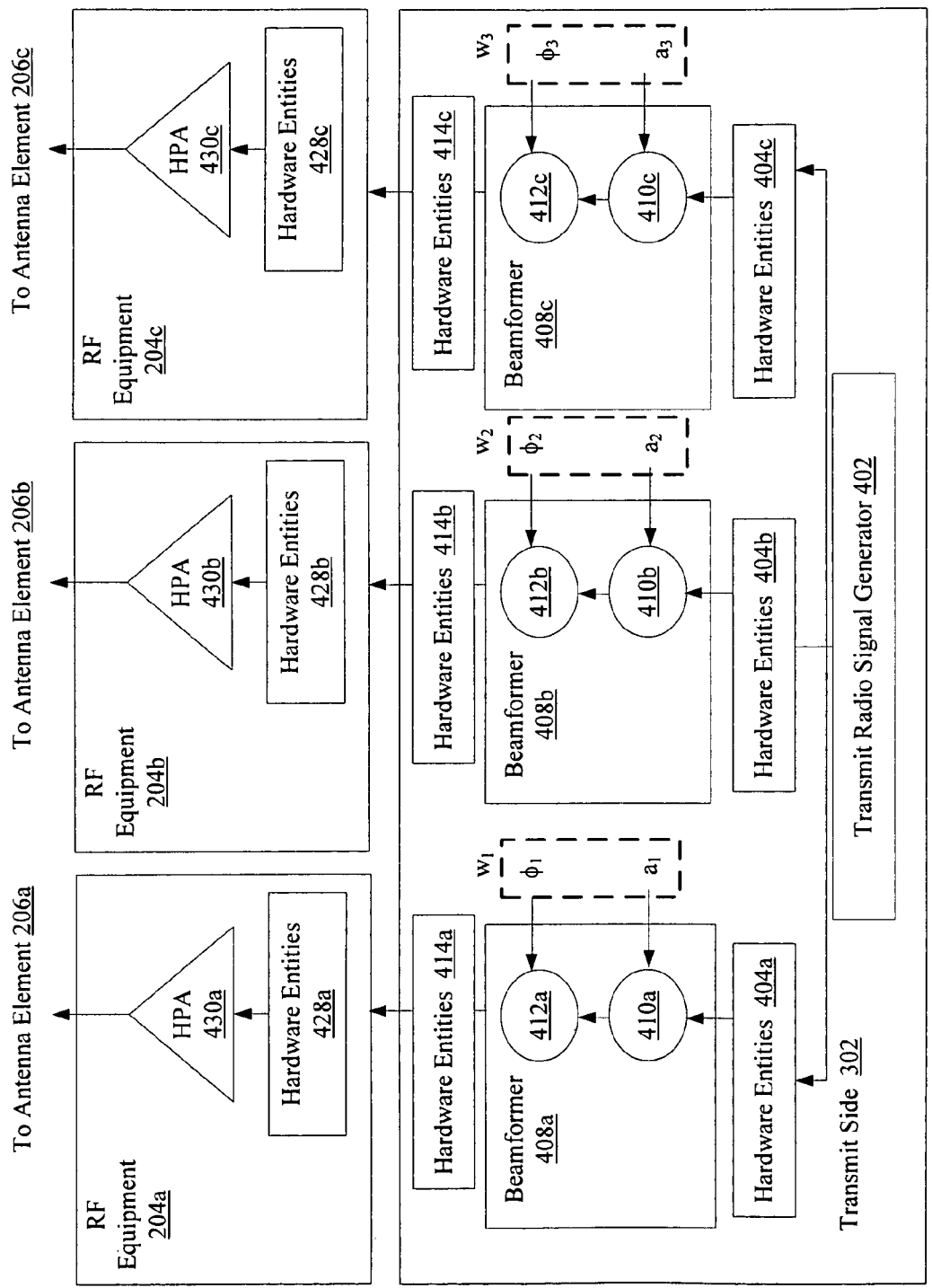
FIG. 4 is a block diagram of the transmit side of the system controller shown in FIG. 3 communicatively coupled to the RF equipment shown in FIG. 2.

Referring now to FIG. 4, there is provided a block diagram of the transmit side 302 of FIG. 3 communicatively coupled to the RF equipment 204a, 204b, 204c of FIG. 2. As shown in FIG. 4, the transmit side 302 is comprised of a Transmit Radio Signal Generator (TRSG) 402, hardware entities 404a, 404b, 404c, and beamformers 408a, 408b, 408c. The TRSG 402 generates signals to be transmitted from the array of antenna elements 206a, 206b, 206c. The TRSG 402 is communicatively coupled to the hardware entities 404a, 404b, 404c. Each of the hardware entities 404a, 404b, 404c is communicatively coupled to a respective one of the beamformers 408a, 408b, 408c.

Each of the beamformers 408a, 408b, 408c can be utilized to control the phase and/or the amplitude of transmit signals for each antenna element 206a, 206b, 206c. In general, the respective phase shifts ($\phi_1$, $\phi_2$, $\phi_3$) and/or amplitude adjustments ($a_1$, $a_2$, $a_3$) for the antenna elements 206a, 206b, 206c can be used to adjust formation of the central beam 212, the side beams (or side lobes) 214 and nulls in the radiation pattern 211 of the MEAS 250. Nulls correspond to directions in which destructive inference results in a transmit signals strength that is significantly reduced with respect to the directions of the central beam 212 and the side beams 214. The combined amplitude adjustments $a_1$, $a_2$, $a_3$ and phase shift adjustments $\phi_1$, $\phi_2$, $\phi_3$ are referred to herein as a complex weight $w_1$, $w_2$, $w_3$. Each of the beamformers 408a, 408b, 408c combines a respective complex weight $w_1$, $w_2$, $w_3$ with the transmit signals to be provided to a respective RF equipment 204a, 204b, 204c. For example, as shown in FIG. 4, each beamformer 408a, 408b, 408c includes respective amplitude adjusters 410a, 410b, 410c for adjusting an amplitude of the transmit signals from hardware entities 404a, 404b, 404c, respectively, based on an amplitude $a_1$, $a_2$, $a_3$. Each beamformer 408a, 408b, 408c also includes phase adjusters 412a, 412b, 412c for adjusting a phase of the transmit signals from hardware entities 404a, 404b, 404c, respectively, based on a respective phase shift $\phi_1$, $\phi_2$, $\phi_3$.

In some embodiments of the present invention, the phase and amplitude adjusted signals from beamformers 408a, 408b, 408c can be communicatively coupled to the RF equipment 204a, 204b, 204c via one or more respective hardware entities 414a, 414b, 414c. The weighted transmit signals from beamformers 408a, 408b, 408c are received at a respective hardware entity 428a, 428b, 428c of the RF equipment 204a, 204b, 204c. The hardware entities 428a, 428b, 428c are communicatively coupled to a respective high power amplifier (HPA) 430a, 430b, 430c. HPAs are well known to those having ordinary skill in the art, and therefore will not be described herein. However, it should be understood that the HPAs 430a, 430b, 430c communicate signals to the antenna elements 206a, 206b, 206c for transmission therefrom in the direction 216 of an object of interest 208.

The term "hardware entities", as used herein, refers to signal processing components, including but not limited to filters and amplifiers, and/or measurement components, such as environmental, physical, or electromagnetic sensors. In some embodiments of the present invention, hardware entities comprising measurement components can also be configured to generate input signals for the ACS 202. For example, hardware entities 414a, 414b, 414c and hardware entities 428a, 428b, 428c can comprise components for performing one or more measurements at one or more points between beamformers 408a, 408b, 408c and RF equipment 204a, 204b, 204c, respectively. The ACS 202 can then adjust the complex weights at beamformers 408a, 408b, 408c dynamically or provide adjustments for the calibration data or the system model to provide improved computation of the complex weights.

Figure 5:
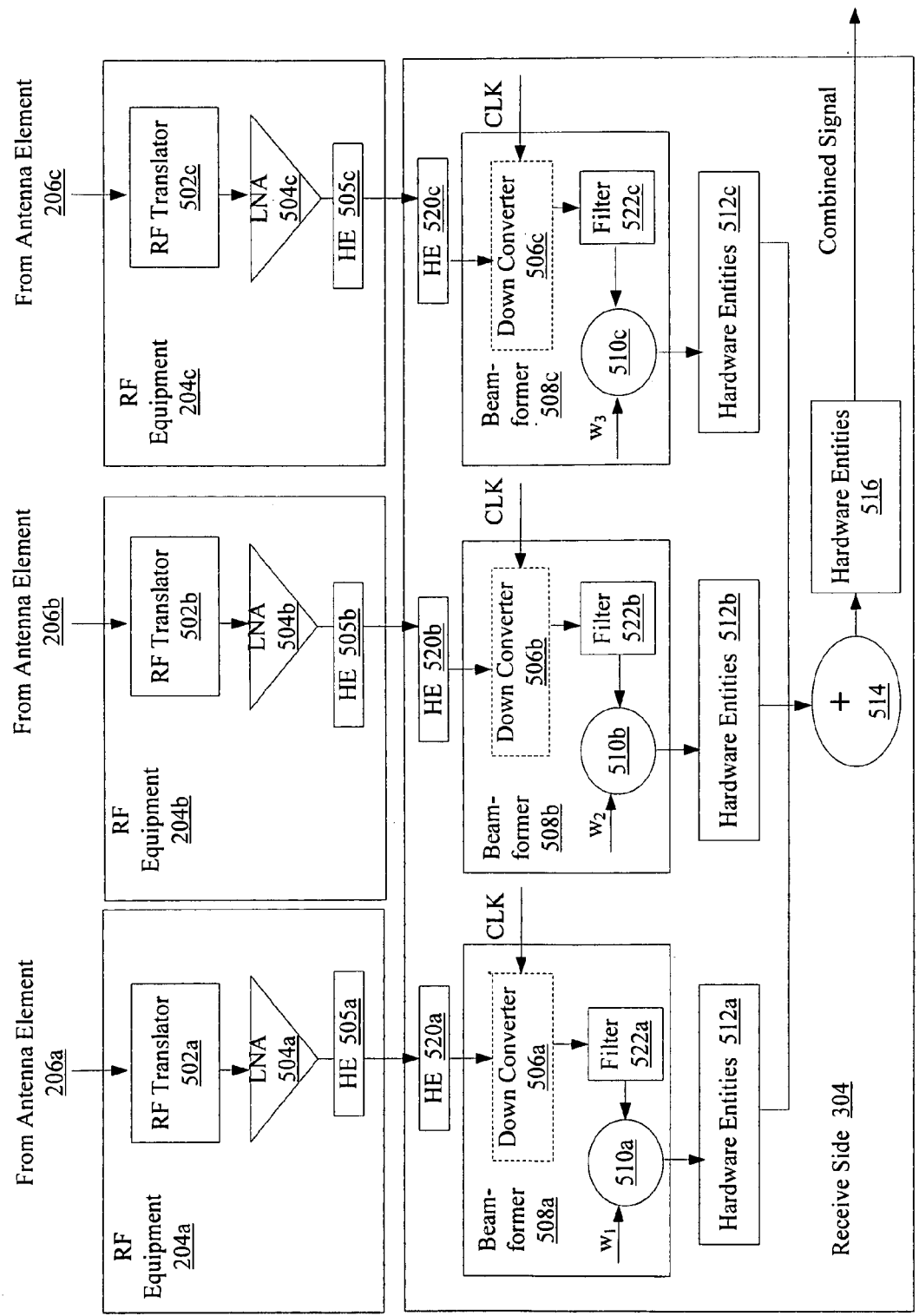
FIG. 5 is a block diagram of the receive side of the system controller shown in FIG. 3 communicatively coupled to the antenna controllers shown in FIG. 2.

Referring now to FIG. 5, there is provided a block diagram of the receive side 304 of FIG. 3 communicatively coupled to the RF equipment 204a, 204b, 204c of FIG. 2. As shown in FIG. 5, each of the RF equipment 204a, 204b, 204c further comprises a Radio Frequency (RF) translator 502a, 502b, 502c and a Low Noise Amplifier (LNA) 504a, 504b, 504c. Each of the RF translators 502a, 502b, 502c performs signal frequency translation of received signals from a respective antenna element 206a, 206b, 206c in the respective antenna controller 204a, 204b, 204c. The translation function of the RF translators 502a, 502b, 502c generally converts the received signal at a respective antenna element 206a, 206b, 206c from an RF to an intermediate frequency (IF). The LNAs 504a, 504b, 504c generally amplify the IF signals output from the RF translators 502a, 502b, 502c, respectively. Each of the LNAs 504a, 504b, 504c is communicatively coupled to the receive side 304 of the ACS 202. In some embodiments, the LNAs 504a, 504b, 504c are communicatively coupled to the receive side 304 of the ACS 202 via one or more hardware entities (HE) 505a, 505b, 505c.

The receive side 304 further includes a plurality of beamformers 508a, 508b, 508c and a signal combiner 514. The receive side 304 can further include input hardware entities 520a, 520b, 520c and output hardware entities 512a, 512b, 512c for the beamformers 508a, 508b, 508c. As shown in FIG. 5, the input hardware entities 520a, 520b, 520c are communicatively coupled between the LNAs 504a, 504b, 504c and beamformers 508a, 508b, 508c. Each of the beamformers 508a, 508b, 508c can include a down converter 506a, 506b, 506c, a filter 522a, 522b, 522c, and a combiner 510a, 510b, 510c. Embodiments of the present invention are not limited in this regard. For example, the beamformers 508a, 508b, 508c can be absent of the down converters 506a, 506b, 506c and filters 522a, 522b, 522c.

Each down converter 506a, 506b, 506c can convert a digitized real signal centered at an IF to a basebanded complex signal centered at zero (0) frequency. The down converters 506a, 506b, 506c can share a common clock (not shown), and therefore receive the same clock (CLK) signal. The CLK signal can be generated within the receive side 304, elsewhere in the ACS 202, or external to the ACS 202. The down converters 506a, 506b, 506c can be set to the same center frequency and bandwidth. The down converters 506a, 506b, 506c can also comprise local oscillators that are in-phase with each other. This in-phase feature of the down converters 506a, 506b, 506c ensures that the down converters 506a, 506b, 506c shift the phases of signals by the same amount. After converting the digitized real signals to basebanded complex signals, the down converters 506a, 506b, 506c communicate the basebanded complex signals to the filters 522a, 522b, 522c, respectively. The filters 522a, 522b, 522c filter the basebanded complex signals and forward the same to the combiners 510a, 510b, 510c.

Each of the combiners 510a, 510b, 510c combines a basebanded complex signal with a complex weight $w_1, w_2, w_3$ for a particular antenna element 206a, 206b, 206c. The complex weights $w_1, w_2, w_3$ are selected to combine the receive signals according to a particular radiation pattern. That is, complex weights $w_1, w_2, w_3$ are selected to provide a central beam 212, side beams 214, and nulls, as described above, so as to preferentially receive signals from one or more preferred directions. The combiners 510a, 510b, 510c can include, but are not limited to, complex multipliers. Thereafter, the combiners 510a, 510b, 510c communicate the signals to the hardware entities 512a, 512b, 512c, respectively. The hardware entities 512a, 512b, 512c can further process the signals received from the beamformers 508a, 508b, 508c. The hardware entities 512a, 512b, 512c communicate the processed signals to the signal combiner 514.

At the signal combiner 514, the processed signals are combined to form a combined signal. The signal combiner can include, but is not limited to, a signal adder. Subsequent to forming the combined signal, the signal combiner 514 communicates the same to the hardware entities 516 for further processing. After processing the combined signal, the hardware entities 516 communicate the same to a demodulator (not shown) for demodulation or other external hardware (not shown) for further processing.

Closed Loop Weight Adjustment

In the communication system 200, the phases of the transmit and receive signals can be shifted as a result of environmental effects on hardware components thereof. For example, the cable assemblies 210a, 210b, 210c and the communication links 218a, 218b, 218c (or 219a, 219b, 219c) of the communication system 200 delay signals between the ACS 202 and the antenna elements 206a, 206b, 206c. In effect, the phases of the signals are shifted thereby resulting in phasing errors. Such phasing errors are exacerbated by the spacing between the antenna elements 206a, 206b, 206c. Phasing errors also occur as a result of environmental effects on the hardware components 202, 204a, 204b, 204c of the communication system 200. The accumulated phasing errors inhibit desirable or adequate beam formation, i.e., the accumulated phasing errors can result in the steering of the radiated central beam 212 in a direction other than the direction 216 of the object of interest 208.

Accordingly, the communication system 200 implements a method for adjusting the phases and/or amplitudes of signals transmitted from and received at each antenna element 206a, 206b, 206c. The phases and/or amplitudes of the transmit and receive signals are adjusted using a plurality of reference signals $V_{ref}$. A first one of the reference signals $V_{ref}$ is compared with a signal having phase shifts for determining a phase offset between the same. The phase offset is then used to control the phase and/or amplitude of a transmit and/or receive signal so as to counteract phasing errors due to cable delay effects, wide antenna spacing effects, and environmental effects on hardware components 202, 204a, 204b, 204c of a communication system 200. More particularly, the phase offset is used to determine the phase and/or amplitude adjustment values that are subsequently combined with transmit and/or receive signals. Systems and methods for determining the reference signals $V_{ref}$ will now be described in relation to FIGS. 6-9. Systems and methods for adjusting the phase and/or amplitude of transmit and receive signals using one or more reference signals $V_{ref}$ will be described below in relation to FIGS. 10A-10B.

Figure 6:
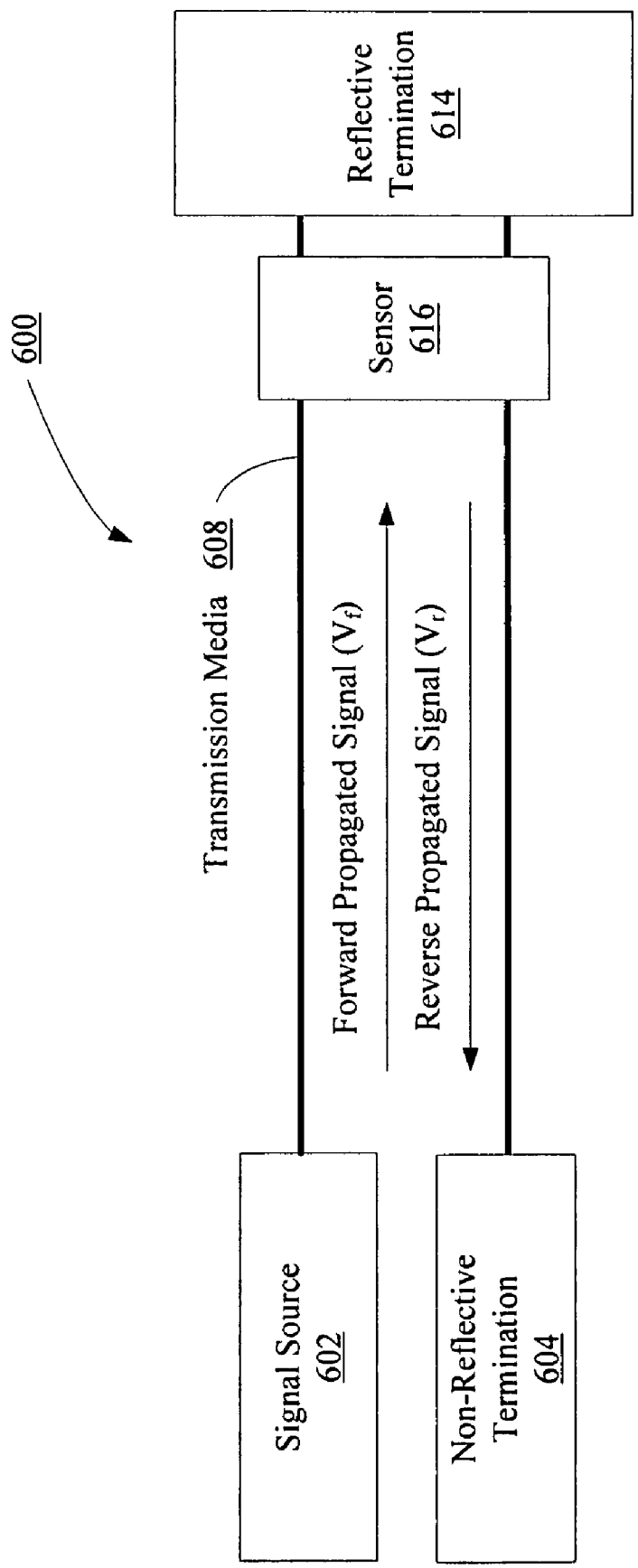
FIG. 6 is a block diagram of a system that is useful for understanding the present invention.

Referring now to FIG. 6, there is provided a block diagram of a communication system 600 that is useful for understanding how a reference signal $V_{ref}$ is determined. As shown in FIG. 6, the communication system 600 can comprise a signal source 602, a sensor 616, a reflective termination 614, and a non-reflective termination 604. Each of these components 602, 604, 614, 616 is well known to those having ordinary skill in the art, and therefore will not be described in detail herein. However it should be understood that in order to determine a reference signal $V_{ref}$, a forward propagated signal $V_f$ and a reverse propagated signal $V_r$ need to be sensed at a location "z" along the transmission media 608. As such, the signal source 602 generally transmits a signal $V_f$ to the reflective termination 614. A reflected version of the transmitted signal $V_r$ is communicated from the reflective termination 614 to the non-reflective termination 604. The sensor 616 senses the presence of a forward propagated signal $V_f$ and a reverse propagated signal $V_r$ on the transmission media 608. The sensor 616 may also adjust the gain of the signals $V_f$, $V_r$ so that they have equal arbitrarily defined amplitudes "a". This gain adjustment can involve performing Automatic Gain Control (AGC) operations which are well known to those having ordinary skill in the art. Thereafter, the sensor 616 outputs signals representing the forward propagated signal $V_f$ and the reverse propagated signal $V_r$. Sensing devices 616 and 608 may as required include gain adjustment, including AGC (Automatic Gain Control) so that their output is a signal with arbitrarily defined output amplitude, a. These output signals can subsequently be used to compute the reference signal $V_{ref}$.

Figure 7:
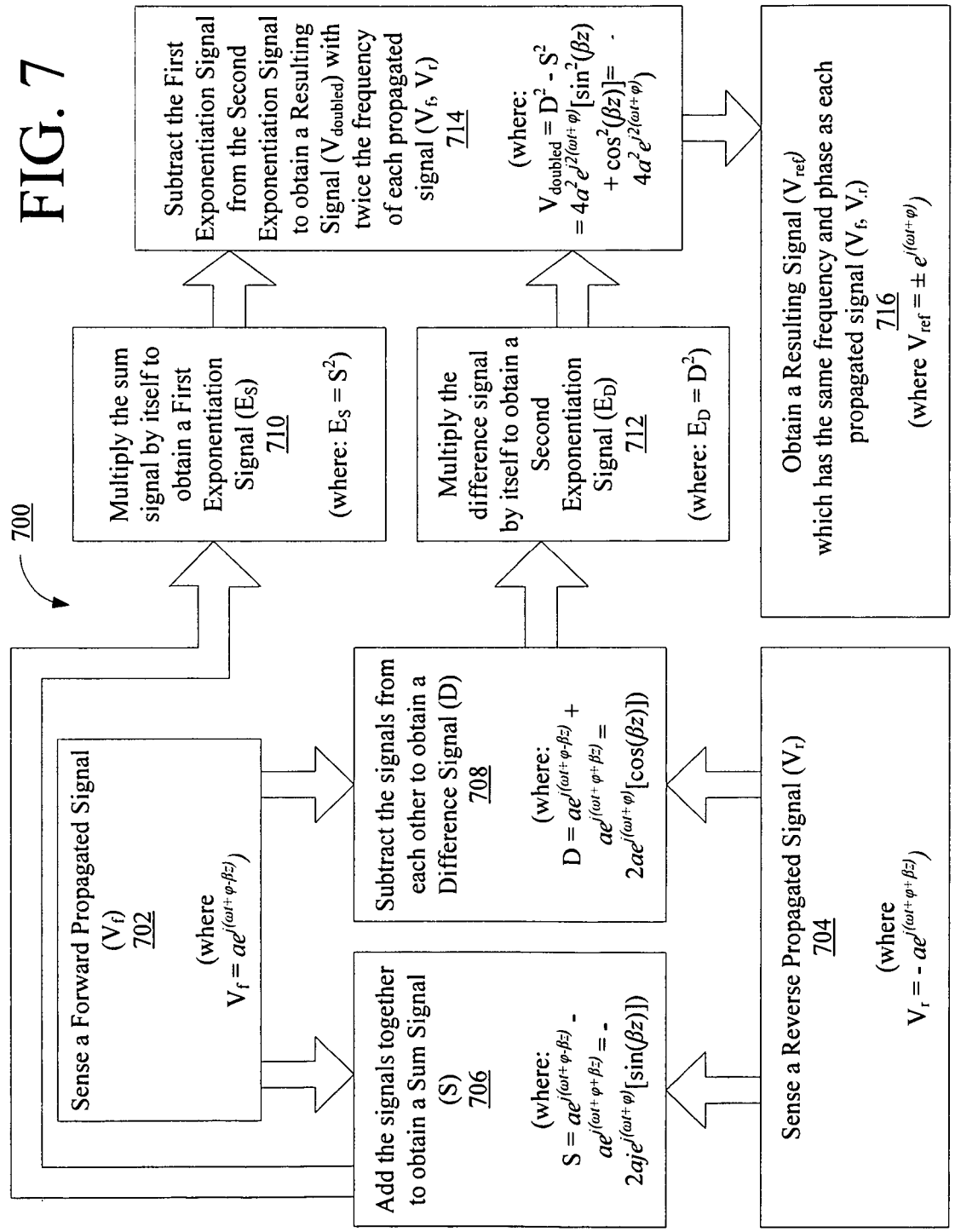
FIG. 7 is a conceptual diagram of an exemplary method (or process) for determining a reference signal that is useful for understanding the present invention.

A conceptual diagram of an exemplary process 700 for determining the reference signal $V_{ref}$ is provided in FIG. 7. As shown in FIG. 7, the process 700 begins by (702, 704) sensing a forward propagated signal $V_f$ and a reverse propagated signal $V_r$. It should be appreciated that the sensing processes (702, 704) can involve gain adjustments as necessary so that the resulting signals have an arbitrarily defined amplitude a. The gain adjustments can include AGC operations. The forward propagated signal $V_f$ can be defined by the following mathematical equation (1). Similarly, the reverse propagated signal $V_r$ (for the exemplary case of a short circuit reflection) can be defined by the following mathematical equation (2).

$$V_f = a e^{j(\omega t + \phi - \beta z)} \tag{1}$$

$$V_r = -a e^{j(\omega t + \phi + \beta z)} \tag{2}$$

where a is signal amplitude. j is the square root of minus one ($j=(-1)^{1/2}$). $\omega$ is a radian frequency. $\phi$ is a phase angle. $\beta$ is a wave number that is equal to $2\pi/\lambda$, where $\lambda$ is a wavelength. z is a location along a transmission media.

Thereafter, a signal combination operation 706 is performed where the signals $V_f$, $V_r$ are combined to obtain a Sum signal (S). This signal combination operation 706 generally involves adding the signals $V_f$, $V_r$ together. The signal combination operation 706 can be defined by the following mathematical equation (3).

$$S = a e^{j(\omega t + \phi - \beta z)} - a e^{j(\omega t + \phi + \beta z)} = -2aj e^{j(\omega t + \phi)} [\sin(\beta z)] \tag{3}$$

As evident from mathematical equation (3), the Sum signal S is a sine signal that depends on the location "z" at which the sensor 616 is placed along the transmission media 608.

The process 700 also involves performing a subtraction operation 708. The subtraction operation 708 generally involves subtracting the reverse propagated signal $V_r$ from the forward propagated signal $V_f$ to obtain a Difference signal (D). The subtraction operation 708 can be defined by the following mathematical equation (4).

$$D = e a^{j(\omega t + \phi - \beta z)} + a e^{j(\omega t + \phi + \beta z)} = 2a e^{j(\omega t + \phi)} [\cos(\beta z)] \tag{4}$$

As evident from mathematical equation (4), the Difference signal D is a cosine signal that depends on the location "z" at which the sensor 616 is placed along the transmission media 608.

After determining the Sum signal S and the Difference signal D, the process 700 continues with a plurality of multiplication operations 710, 712. A first one of the multiplication operations 710 generally involves multiplying the Sum signal S by itself to obtain a first Exponentiation signal $E_S$. The first multiplication operation 710 can generally be defined by the following mathematical equation (5).

$$E_S = S \cdot S = S^2 \tag{5}$$

where $E_S$ is the first Exponentiation signal. S is the Sum signal. $S^2$ is the Sum signal S raised to the second power.

A second one of the multiplication operations 712 generally involves multiplying the Difference signal D by itself to obtain a second Exponentiation signal $E_D$. The second multiplication operation 712 can generally be defined by the following mathematical equation (6).

$$E_D = D \cdot D = D^2 \tag{6}$$

where $E_D$ is the second Exponentiation signal. D is the Difference signal. $D^2$ is the Difference signal D raised to the second power.

Subsequent to determining the first and second Exponentiation signals, the process continues with a subtraction operation 714. The subtraction operation 714 generally involves subtracting the first Exponentiation signal $E_S$ from the second Exponentiation signal $E_D$. The subtraction operation 714 can be defined by the following mathematical equation (7).

$$V_{doubled} = D^2 - S^2 = 4a^2 e^{j2(\omega t + \phi)} [\sin^2(\beta z) + \cos^2(\beta z)] = 4a^2 e^{j2(\omega t + \phi)} \tag{7}$$

where $V_{doubled}$ represents the signal obtained as a result of performing the subtraction operation 714. As evident from mathematical equation (7), the resulting signal $V_{doubled}$ does not depend on the location "z" at which the sensor 716 is placed along the transmission media 608. The resulting signal $V_{doubled}$ has twice the frequency relative to that of each propagated signal $V_f$, $V_r$.

The resulting signal $V_{doubled}$ can be further processed to increase its frequency to a desired value or reduce its frequency to a desired value (i.e., the value of the frequency of a propagated signal $V_f$, $V_r$). If the frequency of the resulting signal $V_{doubled}$ is to be increased to the desired value, then a multiplication operation (not shown) can be performed. If the frequency of the resulting signal $V_{doubled}$ is to be reduced to the desired value, then a frequency reduction operation 716 can be performed.

The frequency reduction operation 716 can generally involve performing a phase locked loop operation and a frequency division operation. Phase locked loop operations are well known to those having ordinary skill in the art, and therefore will not be described herein. The frequency division operation can involve dividing the frequency of the resulting signal $V_{doubled}$ by two (2). The output signal from the frequency reduction operation is the reference signal $V_{ref}$. The reference signal $V_{ref}$ can be defined by the following mathematical equation (8):

$$V_{ref} = \pm e^{j(\omega t + \phi)} \tag{8}$$

for any line position "z". As evident from mathematical equation (8), the reference signal $V_{ref}$ is a signal that does not depend on the location "z" at which the sensor 616 is placed along the transmission media 608. As such, the reference signal $V_{ref}$ can be determined at one or more locations along a transmission media. This location "z" independence is a significant and highly desirable result.

Embodiments of the present invention are not limited to the process 700 described above in relation to FIG. 7. For example, if the frequency of each propagated signal $V_f$, $V_r$ is reduced by exactly half, then the frequency reduction operation 716 need not be performed. In such a scenario, the output signal of the subtraction operation 714 is the reference signal $V_{ref}$.

Figure 8:
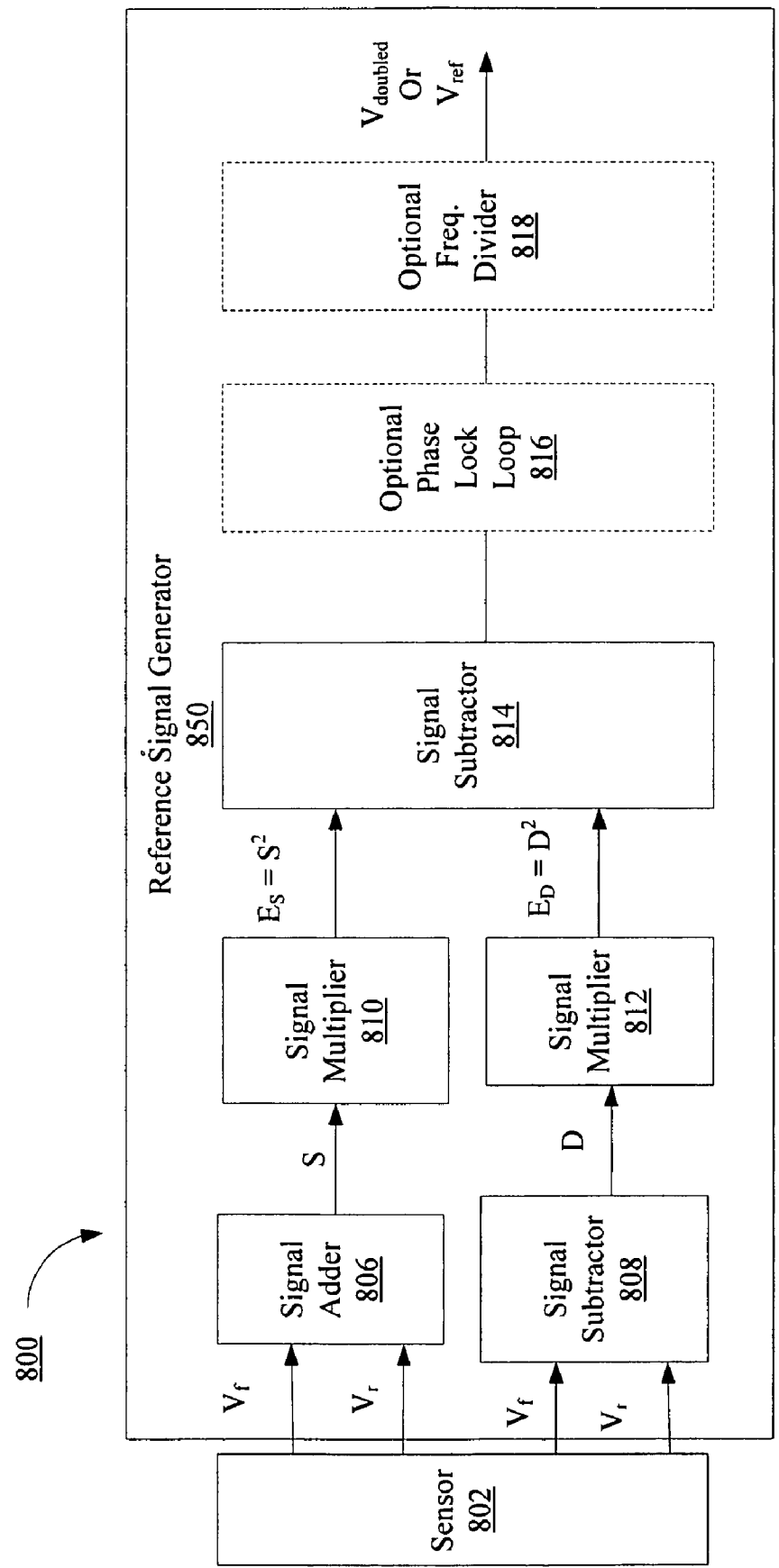
FIG. 8 is a block diagram of a first exemplary system configured to generate a reference signal.

Referring now to FIG. 8, there is provided a block diagram of a first exemplary system 800 implementing a method for determining a reference signal $V_{ref}$. As shown in FIG. 8, the system 800 comprises a sensing device 802 and a reference signal generator 850. The reference signal generator 850 includes a signal adder 806, signal subtractors 808, 814, and signal multipliers 810, 812. The reference signal generator 850 can also comprise an optional phase lock loop 816 and an optional frequency divider 818.

The sensing device 802 is generally configured for sensing the presence of a forward propagated signal $V_f$ and a reverse propagated signal $V_r$ on the transmission media 608. The sensing device 802 may also adjust the gain of the signals $V_f$, $V_r$ so that they have equal arbitrarily defined amplitudes "a". This gain adjustment can involve performing AGC operations. The sensing device 802 can also generate output signals representing the forward propagated signal $V_f$ and the reverse propagated signal $V_r$. These output signals can subsequently be used to compute the signal $V_{doubled}$ and/or the reference signal $V_{ref}$. As such, the sensing device 802 can further communicate the signals representing the forward propagated signal $V_f$ and the reverse propagated signal $V_r$ to the following components 806, 808. Sensing device 802 may as required include gain adjustment, including AGC (Automatic Gain Control) so that $V_f$ and $V_r$ outputs are signals with equal arbitrarily defined output amplitude, a.

The signal adder 806 is generally configured for performing a signal combination operation 706 to obtain a Sum signal S. The signal subtractor 808 is generally configured for performing a subtraction operation 708 to obtain a Difference signal D. The output signals of the components 806, 808 are forwarded to the signal multipliers 810, 812, respectively. Each of the multipliers 810, 812 is configured to perform a respective multiplication operation 710, 712 to obtain a respective Exponentiation signal $E_S$ or $E_D$. The Exponentiation signals $E_S$ and $E_D$ are then communicated to the signal subtractor 814. At the signal subtractor 814, a subtraction operation 714 is performed to obtain a signal $V_{doubled}$ or a reference signal $V_{ref}$.

If the result of the subtraction operation is a signal $V_{doubled}$, then the signal $V_{doubled}$ can be further processed to reduce the value of its frequency. In such a scenario, the signal $V_{doubled}$ is forwarded to an optional phase lock loop 816 and an optional frequency divider 818. The components 816, 818 collectively act to reduce the frequency of the signal $V_{doubled}$ to a desired value (i.e., the value of the frequency of a propagated signal $V_f$, $V_r$). The output of the frequency divider 818 is the reference signal $V_{ref}$.

Figure 9:
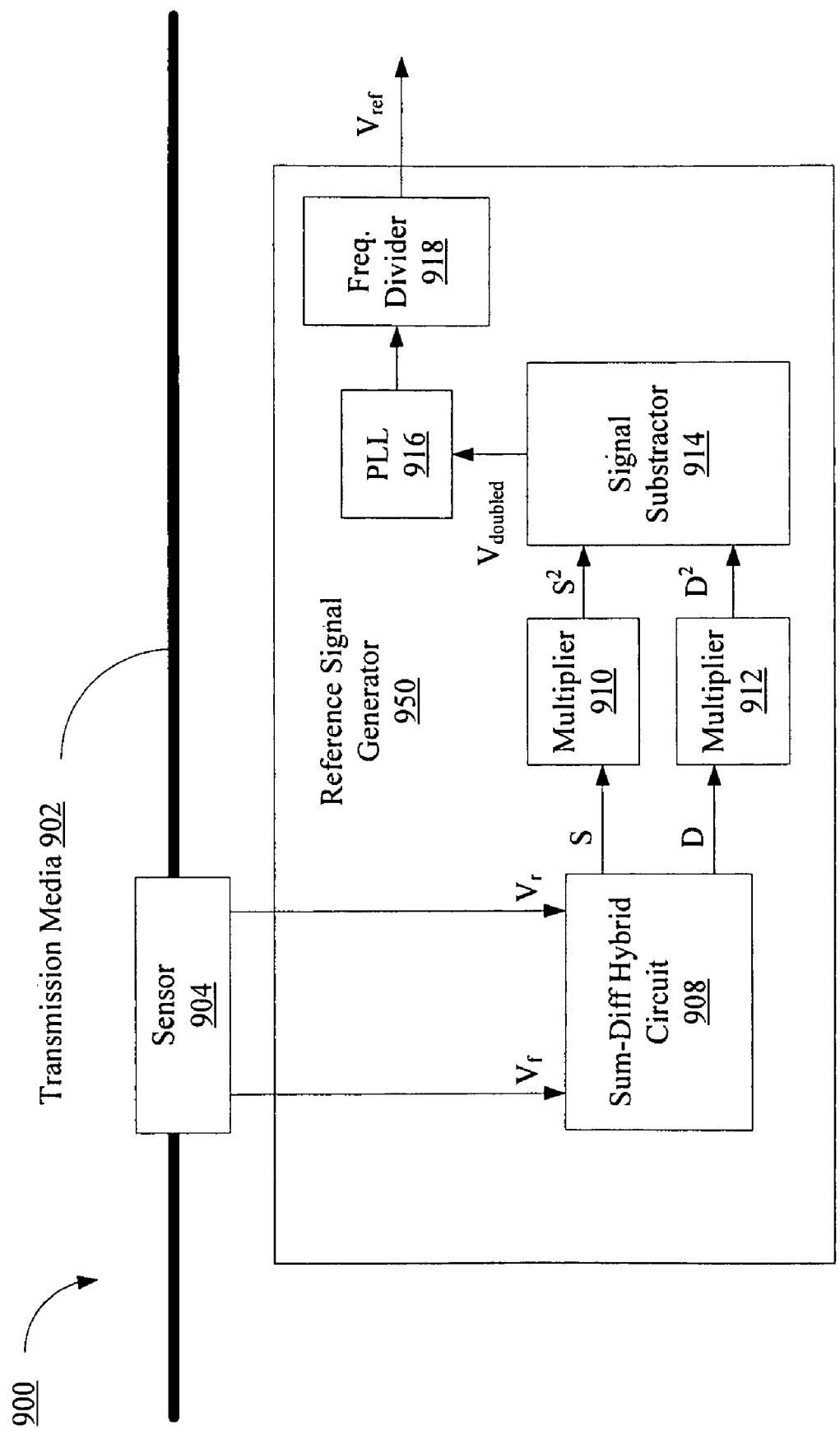
FIG. 9 is a block diagram of a second exemplary system configured to generate a reference signal.

Referring now to FIG. 9, there is provided a block diagram of a second exemplary system 900 implementing a method for determining a reference signal $V_{ref}$. As shown in FIG. 9, the system 900 comprises a sensing device 904 disposed along a transmission media 902 and a reference signal generator 950. The reference signal generator 950 comprises a sum-diff hybrid circuit 908, multipliers 910, 912, a signal subtractor 914, a phase lock loop (PLL) 916, and a frequency divider 918. Embodiments of the present invention are not limited to the configuration shown in FIG. 9. For example, the reference signal generator 950 can be absent of the PLL 916 and the frequency divider 918.

The sensing device 904 is generally configured for sensing the presence of a forward propagated signal $V_f$ and a reverse propagated signal $V_r$ on the transmission media 902. The sensing device 904 may also adjust the gain of the signals $V_f$, $V_r$ so that they have equal arbitrarily defined amplitudes "a". This gain adjustment can involve performing AGC operations. The sensing device 904 can also generate output signals representing the forward propagated signal $V_f$ and the reverse propagated signal $V_r$. These output signals can subsequently be used to compute the reference signal $V_{ref}$. As such, the sensing device 904 can further communicate the signals representing the forward propagated signal $V_f$ and the reverse propagated signal $V_r$ to the sum-diff hybrid circuit 908.

The sum-diff hybrid circuit 908 is generally configured for performing a signal combination operation 706 to obtain a Sum signal S and a subtraction operation 708 to obtain a Difference signal D. Subsequent to completing the signal combination operation and subtraction operation, the sum-diff hybrid circuit 908 communicates the signals S and D to the multipliers 910, 912, respectively. Each of the multipliers 910, 912 is configured to perform a multiplication operation 710, 712 to obtain a respective Exponentiation signal $E_S$, $E_D$. The Exponentiation signals $E_S$, $E_D$ are then communicated to the signal subtractor 914. At the signal subtractor 914, a subtraction operation 714 is performed to obtain a signal $V_{doubled}$. The signal $V_{doubled}$ is then processed by the PLL 916 and frequency divider 918 to reduce the frequency of the signal $V_{doubled}$ to a desired value (i.e., the value of the frequency of a propagated signal $V_f$, $V_r$). The output of the frequency divider 918 is the reference signal $V_{ref}$.

Figure 10A:
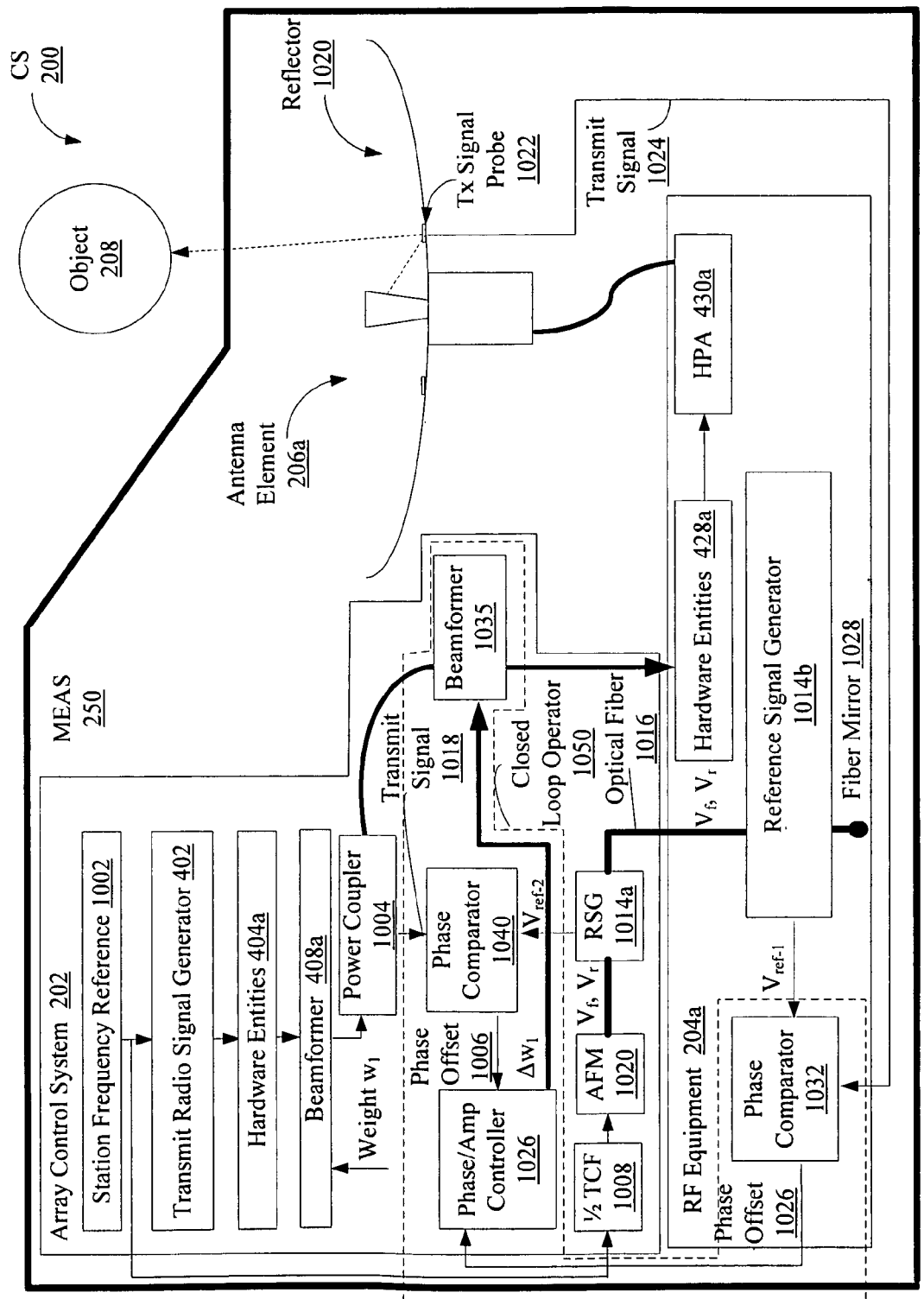
FIG. 10A is a more detailed block diagram of the communications system of FIG. 2.
Figure 10B:
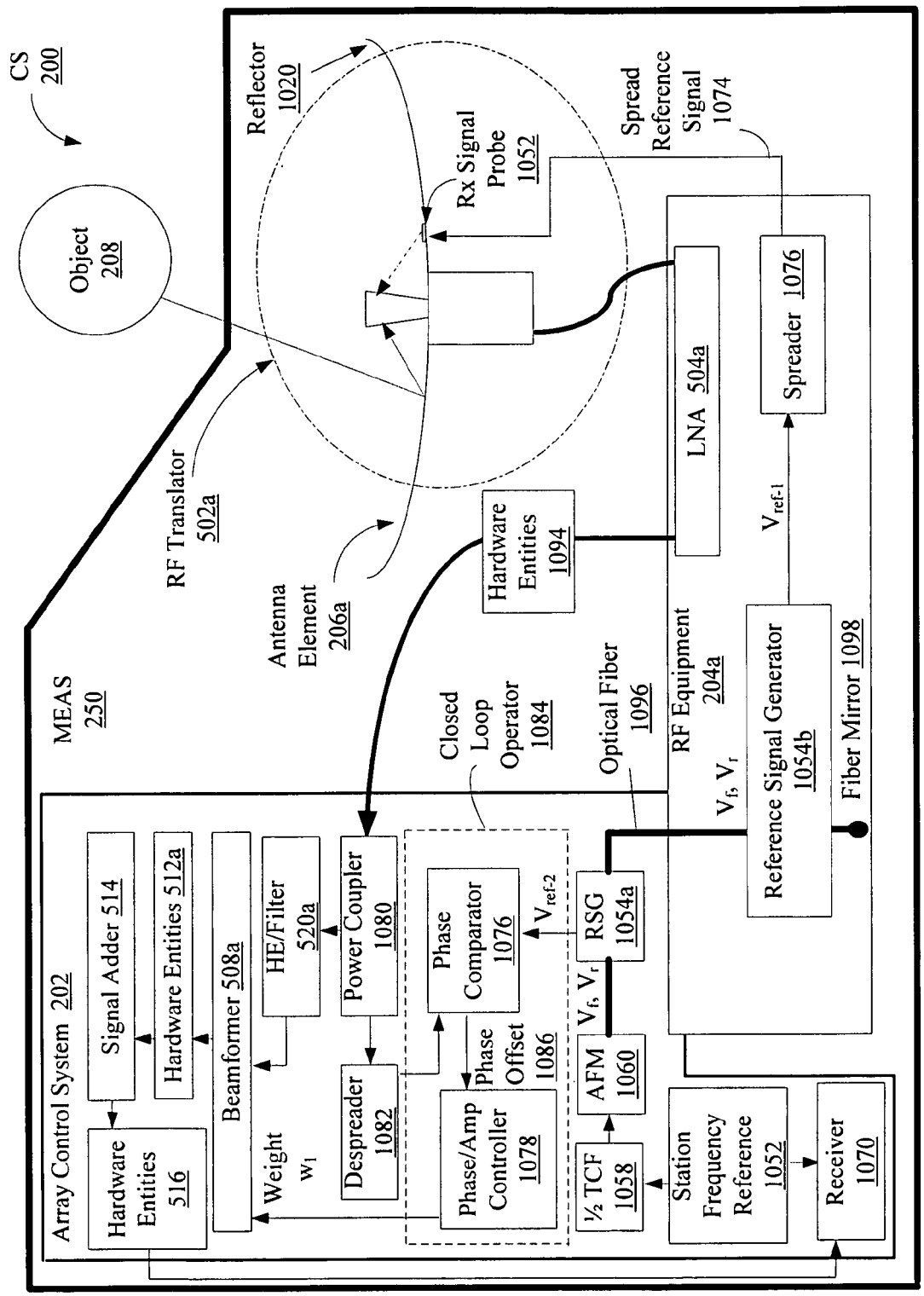
FIG. 10B is a more detailed block diagram of the communications system of FIG. 2.

Referring now to FIGS. 10A-10B, there are provided more detailed block diagrams of the communication system 200 that are useful for understanding the phase and/or amplitude adjustment functions thereof. The phase and/or amplitude adjustments functions of the transmit side 302 will be described below in relation to FIG. 10A. The phase and/or amplitude adjustments functions of the receive side 304 will be described below in relation to FIG. 10B. Notably, the antenna elements 206b, 206c and RF equipment 204b, 204c are not shown in FIGS. 10A-10B to simplify the following discussion. However, it should be understood that the antenna elements 206b, 206c are the same as or substantially similar to the antenna element 206a. Similarly, the RF equipment 204b, 204c is the same as or substantially similar to the RF equipment 204a.

As shown in FIG. 10A, the ACS 202 comprises a station frequency reference 1002, the TRSG 402, hardware entities 404a, beamformers 408a, 1035, a power coupler 1004, the phase/amplitude controller 1026, the phase comparator 1040, and a reference signal generator 1014a. As also shown in FIG. 10A, the RF equipment 204a comprises hardware entities 428a, the HPA 430a, the phase comparator 1032, and a reference signal generator 1014b. As further shown in FIG. 10A, the MEAS 250 comprises a ½ transmit carrier frequency device 1008, an analog fiber modulator 1020, an optical fiber 1016, and a fiber mirror 1028. Although a single power coupler 1004 is shown in FIG. 10A, embodiments of the present invention are not limited in this regard. For example, the MEAS 250 can include one or more power couplers 1004.

The TRSG 402 of the ACS 202 can generate signals to be transmitted from the antenna elements 206a, 206b (not shown), 206c (not shown). The TRSG 402 is communicatively coupled to the station frequency reference 1002 and the hardware entities 404a. The hardware entities 404a are communicatively coupled to the beamformer 408a.

As noted above in relation to FIG. 4, the beamformer 408a can be utilized to control the phases and/or the amplitudes of transmit signals. Accordingly, the beamformer 408a combines a complex weight $w_1$ with transmit signals to be provided to the RF equipment 204a, 204b (not shown), and/or 204c (not shown).

The beamformer 408a is communicatively coupled to power coupler 1004. The power coupler 1004 is communicatively coupled to the closed loop operator 1050. The closed loop operator 1050 will be described below. However, it should be understood that the closed loop operator 1050 is generally configured for adjusting the phase and/or amplitude of transmit signals. The closed loop operator 1050 is also configured to communicate phase and/or amplitude adjusted transmit signals to the hardware entities 428a of the RF equipment 204a. The hardware entities 428a are communicatively coupled to the HPA 430a. The HPA 430a communicates processed signals to the antenna element 206a for transmission therefrom.

The closed loop operator 1050 is generally configured for controlling the phases and/or amplitudes of transmit signals so as to counteract phasing errors due to cable delay effects, wide antenna spacing effects, and environmental effects on hardware components 202 and 204a of the communication system 200. Accordingly, the closed loop operator 1050 includes phase comparators 1040, 1032, a phase/amplitude controller 1026, and a beamformer 1035. Each of the phase comparators 1040, 1032 can include, but are not limited to, balanced phase detectors (not shown), operational amplifiers (not shown), low power filters (not shown), and analog to digital converters (not shown). Although a single closed loop operator 1050 is shown in FIG. 10A, embodiments of the present invention are not limited in this regard. For example, the MEAS 250 can include a closed loop operator 1050 for each antenna element 206a, 206b (not shown), 206c (not shown).

The phase comparator 1032 is configured to receive a transmit signal 1024 from the antenna element 206a and a reference signal $V_{ref-1}$ from a reference signal generator 1014b. In this regard, it should be understood that the antenna element 206a has a transmit (Tx) signal probe 1022 disposed on its reflector 1020 for sensing the transmit signal 1024. In order to avoid the introduction of phase offsets into transmit signals, the communication path between the Tx signal probe 1022 and the phase comparator 1032 can be minimized. At the phase comparator 1032, the phase of the sensed transmit signal 1024 is compared with the phase of the reference signal $V_{ref-1}$ to determine a phase offset 1026. The phase offset 1026 can be represented in terms of an imaginary part Q and a real part I. The phase offset 1026 is then communicated from the phase comparator 1032 to the phase/amplitude controller 1026.

The reference signal $V_{ref-1}$ utilized by the phase comparator 1032 is generated by the reference signal generator 1014b. The reference signal generator 1014b is configured to receive sensed signals $V_f$, $V_r$ from one or more sensor devices (not shown) disposed on the optical fiber 1016 at a first location. Additionally or alternatively, the reference signal generator 1014b is configured to sense signals $V_f$, $V_r$ propagated along the optical fiber 1016. The sensed signals $V_f$, $V_r$ are used to determine the reference signal $V_{ref-1}$. The manner in which the reference signal $V_{ref-1}$ is determined is described above in relation to FIGS. 6-7. The reference signal generator 1014b can be the same as or substantially similar to any one of the reference signal generators described below in relation to FIGS. 8-9.

The phase comparator 1040 is configured to receive a transmit signal 1018 from the power coupler 1004 and a reference signal $V_{ref-2}$ from a reference signal generator 1014a. At the phase comparator 1040, the phase of the transmit signal 1018 is compared with the phase of the reference signal $V_{ref-2}$ to determine a phase offset 1006. The phase offset 1006 can be represented in terms of an imaginary part Q and a real part I. The phase offset 1006 is then communicated from the phase comparator 1040 to the phase/amplitude controller 1026.

The reference signal $V_{ref-2}$ utilized by the phase comparator 1040 is generated by the reference signal generator 1014a. The reference signal generator 1014a is configured to receive sensed signals $V_f$, $V_r$ from one or more sensor devices (not shown) disposed on the optical fiber 1016 at a second location different from the first location. Additionally or alternatively, the reference signal generator 1014a is configured to sense signals $V_f$, $V_r$ propagated along the optical fiber 1016. The sensed signals $V_f$, $V_r$ are used by the reference signal generator 1014a to determine the reference signal $V_{ref-2}$. The manner in which the reference signal $V_{ref-2}$ is determined is described above in relation to FIGS. 6-7. The reference signal generator 1014a can be the same as or substantially similar to any one of the reference signal generator described below in relation to FIGS. 8-9. The reference signal generator 1014a can also be the same as or substantially similar to the reference signal generator 1014b.

The phase/amplitude controller 1026 determines a phase and/or amplitude adjustment value $\Delta w_1$ that is to be used by a beamformer 1035 to control the phase and/or amplitude of transmit signals. The phase and/or amplitude adjustment value $\Delta w_1$ is determined using the received phase offset 1006, 1026 values received from the phase comparators 1040, 1032, respectively.

As shown in FIG. 10B, the ACS 202 comprises a station frequency reference 1052, a receiver 1070, the hardware entities 516, 512a, the signal adder 514, the beamformer 508a, the HE/filter 520a, a power coupler 1080, a despreader 1082, a phase/amplitude controller 1078, a phase comparator 1076, and a reference signal generator 1054a. As also shown in FIG. 10B, the RF equipment 204a comprises the LNA 504a, a reference signal generator 1054b, and a spreader 1076. As further shown in FIG. 10B, the MEAS 250 comprises a ½ transmit carrier frequency device 1058, an analog fiber modulator 1060, an optical fiber 1096, and a fiber mirror 1098.

During operation, the object of interest 208 communicates a signal to the MEAS 250. The signal is received at the antenna element 206a. The antenna element 206a includes a reflector 1020 with an Rx signal probe 1052 disposed thereon. The Rx signal probe 1052 transmits a spread reference signal 1074 generated by a spreader 1076. The spreader 1076 is provided to ensure that the reference signal $V_{ref-1}$ does not interfere with received signals. The spreader 1076 can be, but is not limited to, a random number spreader or a pseudo-random number spreader. The spreader 1076 can receive a reference signal $V_{ref-1}$ from the reference signal generator 1054b and utilize the reference signal $V_{ref-1}$ to generate the spread reference signal 1074. More particularly, the spreader 676 can combine the reference signal $V_{ref-1}$ with a random or pseudo-random number sequence to obtain the spread reference signal 624. Embodiments of the present invention are not limited in this regard. For example, the MEAS 150 can be absent of the spreader 676. In such a scenario, the MEAS 150 can alternatively include a frequency adjuster configured for offsetting the frequency of the reference signal $V_{ref-1}$ by a desired amount. The desired amount can be selected for ensuring that the reference signal $V_{ref-1}$ does not interfere with receive signals.

At the antenna element 206a, the received signal is combined with the spread reference signal 1074 to form a spread spectrum signal. This signal combination can be accomplished by the performance of signal addition operations, which are well known to those having ordinary skill in the art. The spread spectrum signal is then communicated to the LNA 504a of the RF equipment 204a. The LNA 504a processes the spread spectrum signal and communicates the processed spread spectrum signal to the power coupler 1080 of the ACS 202 or optional hardware entities 1094.

The reference signal $V_{ref-1}$ utilized by the spreader 1076 is generated by the reference signal generator 1054b. The reference signal generator 1054b is configured to receive sensed signals $V_f$, $V_r$ from one or more sensor devices (not shown) disposed on the optical fiber 1096 at a first location. Additionally or alternatively, the reference signal generator 1054b is configured to sense signals $V_f$, $V_r$ propagated along the optical fiber 1096. The sensed signals $V_f$, $V_r$ are used to determine the reference signal $V_{ref-1}$. The manner in which the reference signal $V_{ref-1}$ is determined is described above in relation to FIGS. 6-7. The reference signal generator 1054b can be the same as or substantially similar to any one of the reference signal generators described above in relation to FIGS. 8-9.

At the ACS 202, the power coupler 1080 receives the spread spectrum signal from the RF equipment 204a and processes the same. Thereafter, the power coupler 1080 communicates the processed spread spectrum signal to the despreader 1082 and the HE/filter 520a. At the despreader 1082, operations are performed with a known despreading code sequence to despread the spread spectrum signal. The dispreading code sequence can be the same as the spread reference signal 1074. The despread signal is then communicated from the despreader 1082 to the closed loop operator 1084. Although a single closed loop operator 1084 is shown in FIG. 10B, embodiments of the present invention are not limited in this regard. For example, the ACS 202 can include a closed loop operator 1084 for each antenna element 206a, 206b (not shown), 206c (not shown).

The closed loop operator 1084 is generally configured for controlling the phases and/or amplitudes of receive signals so as to counteract phasing errors due to cable delay effects, wide antenna spacing effects, and environmental effects on hardware components 202 and 204a of the communication system 200. Accordingly, the closed loop operator 1084 includes a phase comparator 1076 and a phase/amplitude controller 1078.

The phase comparator 1076 is configured to receive a despread signal from the despreader 1082 and a reference signal $V_{ref-2}$ from a reference signal generator 1054a. At the phase comparator 1076, the phase of the despread signal is compared with the phase of the reference signal $V_{ref-2}$ to determine a phase offset 1086. The phase offset 1086 can be represented in terms of an imaginary part Q and a real part I. The phase offset 1086 is then communicated from the phase comparator 1076 to the phase/amplitude controller 1078.

The reference signal $V_{ref-2}$ utilized by the phase comparator 1076 is generated by the reference signal generator 1054a. The reference signal generator 1054a is configured to receive sensed signals $V_f$, $V_r$ from one or more sensor devices (not shown) disposed on the optical fiber 1096 at a first location. Additionally or alternatively, the reference signal generator 1054a is configured to sense signals $V_f$, $V_r$ propagated along the optical fiber 1096. The sensed signals $V_f$, $V_r$ are used to determine the reference signal $V_{ref-2}$. The manner in which the reference signal $V_{ref-2}$ is determined is described above in relation to FIGS. 6-7. The reference signal generator 1054a can be the same as or substantially similar to any one of the reference signal generator described below in relation to FIGS. 8-9. The reference signal generator 1054a can also be the same as or substantially similar to the reference signal generator 1054b described above.

The phase/amplitude controller 1078 determines the complex weight $w_1$ that is to be used by a beamformer 508a to control the phase and/or amplitude of receive signals. The complex weight $w_1$ is determined using the received phase offset 1086 values received from the phase comparator 1076. More particularly, the phase/amplitude controller 1078 adjusts the complex weight $w_1$ using the phase offset values.

Transmission Phase Correction

As previously described, an additional aspect of the present invention is to adjusting the phase of transmitted signals to correct for phasing errors due to location errors and transmission conditions. One of the difficulties with beamforming techniques is that such pre-defined system models generally assume ideal transmission conditions in the transmission medium (e.g., air, space) and perfect alignment of the antenna elements. That is, it is generally assumed that the phase of a signal transmitted by the different antenna elements and the locations of the antenna elements in the array are accurately known and that directional beams and nulls generated by the signals from each antenna element occur at the locations specified by the model. Unfortunately, this is generally not the case for most multi-element antenna arrays, especially when the antenna elements are spread out over a large distance.

Typically, the signals transmitted by one or more antenna elements in a multi-element antenna suffer from some amount of phasing error due to objects in the transmission medium and slight errors in the locations of the antenna elements. For example, objects such as clouds and other atmospheric effects can affect the phase of the signal being transmitted and the locations of the antenna element may not be known with a high degree of accuracy. Since beamforming relies on phase coordination of the signals generated by the various antenna element in an array, based on the locations of the antenna elements, such phasing errors can result in reduced signal strength at the target object or even formation of a null.

Therefore, in some various embodiments of the present invention, a phase correction for a transmitted signal at an antenna element is provided that is based on signals received by the array of antenna elements from one or more radiometric sources. The received signals can be used to compute a differential distance for the antenna element relative to a reference antenna element to determine the amount of phase correct needed. Since both signals from radiometric sources can be received and the phase corrections can be computed during transmission, such systems and method provide significant advantages over than long loop methods by reducing or eliminating latency issues and availability. Furthermore, such phase corrections can be computed based on a received signal at the same or different frequency as the frequency of transmission.

The term "differential distance", as used herein, refers to the additional distance a wavefront needs to travel to reach a phase center of the second antenna element after the wavefront has reached a phase center of the first antenna element. The term "phase center", as used herein with respect to an antenna element, refers to a point from which the electromagnetic radiation generated by the antenna element spreads spherically outward, with the phase of the signal being generally equal at any point on the sphere.

Figure 11A:
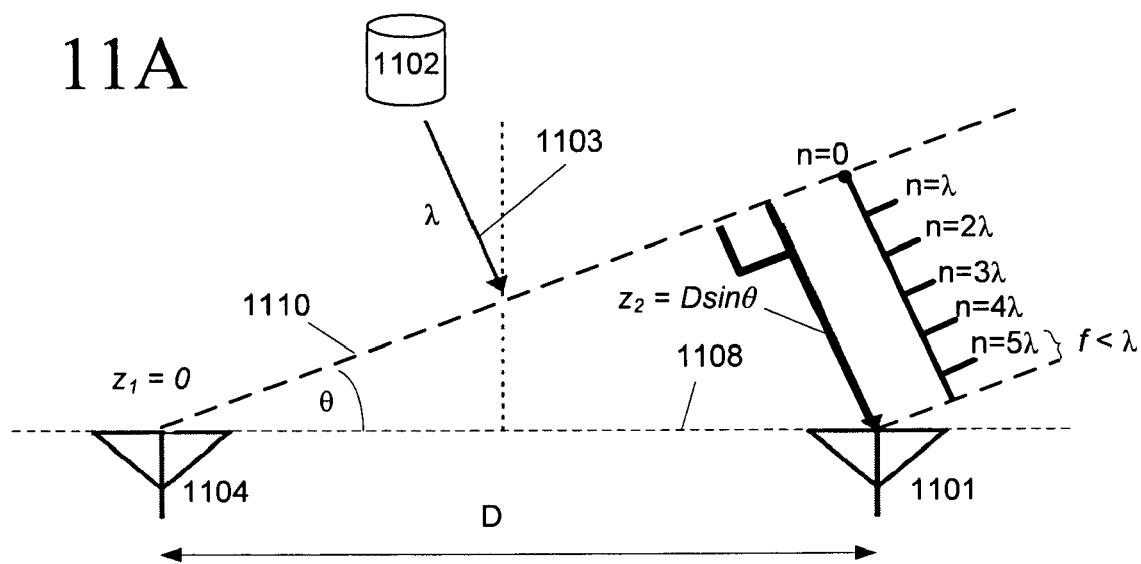
FIGS. 11A and 11B are schematic views of possible causes of differential distances between antenna elements in an array.

In general, a differential distance between antenna elements is typically associated with a particular angle of arrival (AOA) of the signal at the antenna elements. That is, the angle of the wavefront of the received signal with respect to a plane containing the first and second antenna elements. This is conceptually illustrated in two dimensions in FIG. 11A. In general, unless an object 1102 transmits a signal 1103 at a wavelength λ towards first 1104 and second 1106 antenna elements separated by a distance D in a direction normal to the plane 1108 defined by the phase centers of the first 1104 and second 1106 antenna elements, the wavefront 1110 of the signal 1103 will arrive at the plane 1108 at some AOA (θ) that is greater or less than zero. As a result, as shown in FIG. 11A, the wavefront 1110 will reach the first antenna element 1104 at a first time and at a later time the wavefront 1110 will reach the second antenna element 1106. As a result, the portion of the wavefront 1110 reaching the second antenna element 1106 travels an additional distance D sin θ, a differential distance $z_2$.

Figure 11B:
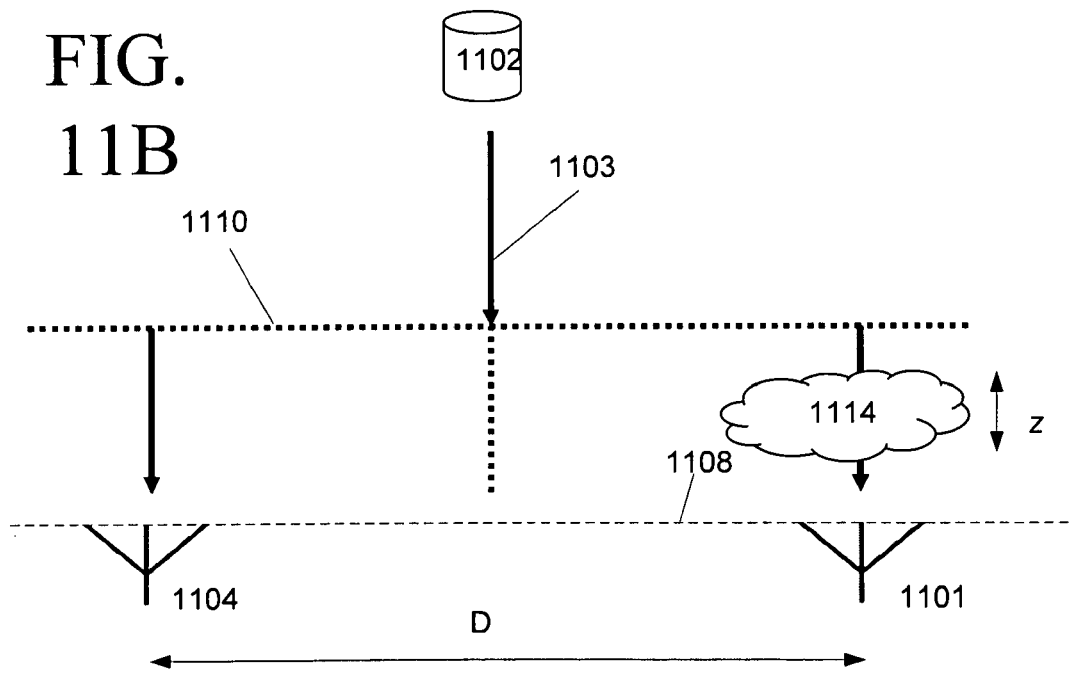

Although the differential distance Z could be estimated based on θ and D, the actual differential distance is affected by other factors, resulting in a difference between the estimated and actual differential distances. For example, value of D may not be accurate know. In another example, variation in the actual differential distance can also arise if objects are present in the path of the portion of the signal reaching at least one of the antenna elements. For example, as shown in FIG. 11B, the portion of the signal reaching the second antenna element 1106 may pass through a cloud 1114 or other atmospheric disturbance or phenomena. As a result, even if the signal 1103 is transmitted normal to the plane 1108 defined by the phase centers of the first 1102 and second 1104 antenna elements, as shown in FIG. 11B, the wavefront will propagate differently through cloud 1114. This difference in propagation effectively operates as a differential distance Z.

For illustrative purposes, the various embodiments of the present invention will be described with respect to first and second antenna elements, where one of the antenna elements is a reference element. However, the various embodiments of the present invention are not limited to determining the differential distances with respect to a reference antenna element. Rather, in some embodiments of the present invention, a reference location can be utilized instead and each antenna element in the array will be associated with a differential distance with respect to the reference location. For example, with respect to FIGS. 11A and 11B, the first antenna element 1102 can comprise a location with or without an antenna element. Although any reference location can be selected, in some embodiments of the present invention, the reference location is selected to be within the antenna array.

As previously described, the phase of a signal will vary as it travels through a communications medium (e.g., air or space). If a signal travels a differential distance Z, as described above, the signal 1103 will undergo additional phase variation or phase propagation prior to reaching the second antenna element 1106 as compared to the first antenna element 1104. This difference can generally be expressed as n+f wavelengths, where n is the number of whole or complete wavelengths and f is the number of fractional wavelengths (f<λ) the phase of the signal varies over the differential distance. For example, as shown in FIG. 11A, the signal 1103 undergoes a phase propagation of 5λ+f over the differential distance z2. This quantity can also be expressed as $z_2/\lambda_{RX}$, where $z_2$ is the differential distance for the second antenna element and $\lambda_{RX}$ is the wavelength of the signal being received.

The difference in phase (n+f) can generally be modeled using the steering vector ($\vec{v}$). A "steering vector", as known to one or ordinary skill in the art, is an array describing the properties of the signal at each antenna element. A steering vector for two elements, as shown in FIG. 11A, can generally be expressed as shown below in Equation (9):

$$\vec{v} = \begin{bmatrix} amplitude_1 \, e^{j(\omega t - \beta z_1)} \\ amplitude_2 \, e^{j(\omega t - \beta z_2)} \end{bmatrix} \quad (9)$$

where ω is a radian frequency of the signal, β is a wave number of the signal expressed as $2\pi/\lambda_{RX}$, and $z_i$ is differential distance for each element.

For large arrays of reflector elements (i.e., greater than 200's of meters), the steering vector can be rewritten as a product of signal amplitude, frequency, and phase, as shown in below in Equation (10):

$$\vec{v} = \begin{bmatrix} amplitude_1 \\ \vdots \\ amplitude_k \end{bmatrix} \otimes \begin{bmatrix} e^{j\omega t} \\ \vdots \\ e^{j\omega t} \end{bmatrix} \otimes \begin{bmatrix} e^{-j\beta z_1} \\ \vdots \\ e^{-j\beta z_k} \end{bmatrix} \quad (10)$$

where $$\begin{bmatrix} e^{-j\beta z_1} \\ \vdots \\ e^{-j\beta z_k} \end{bmatrix}$$

is the array factor, $$\beta = \frac{2\pi}{\lambda}, z = D\hat{u},$$

and $$\hat{u} = \begin{bmatrix} \sin\theta_i \cos\phi_i \\ \sin\theta_i \sin\phi_i \\ \cos\theta_i \end{bmatrix}$$

for a signal, i, which allows the steering vector phase term to specify an array factor vector (AF), to be used model the phase difference between the antenna elements. In the 2-element case depicted in FIG. 11A:

$$AF \triangleq \begin{bmatrix} e^{-j\beta z_1} \\ e^{-j\beta z_2} \end{bmatrix} = \begin{bmatrix} 1 \\ e^{-j\frac{2\pi}{\lambda}D\sin\theta} \end{bmatrix} \quad (11)$$

Since $z_1$=D sin θ=0 for the first element 1104 (i.e., the reference element in the array) and $e^0$=1.

This term is a function of array frequency $1/\lambda_{RX}=f_{RX}/c$ (where c is the speed of light) and the distance or separation between the elements, D. Therefore, assuming that the first element is used as a phase reference, then the fractional phase difference (f) at the second antenna element is described by Equation (12):

$$\mathrm{mod}2\pi\left(\frac{z}{\lambda_{Rx}}\right) = \mathrm{mod}2\pi\left(\frac{D\sin\theta}{\lambda_{Rx}}\right) = f \quad (12)$$

where f is the modeled fractional part of a wavelength at the receive frequency, $f_{Rx}$ for the second antenna element. After calculating the fraction portion, f using the BSS process described below, the whole number of wavelengths, n can be calculated as shown below:

$$\frac{D\hat{u}}{\lambda_{Rx}} = \frac{z}{\lambda_{Rx}} = n + f \qquad (13)$$

where $$\hat{u} = \begin{bmatrix} \sin\theta_i \cos\phi_i \\ \sin\theta_i \sin\phi_i \\ \cos\theta_i \end{bmatrix}$$

is a unit line of sight vector for a particular signal, i. Using Equation (13), the modeled differential distance can be replaced by the true differential distance. The true differential distance can then be used for correcting beamforming during a transmission operation. For example, the true differential distance can be used with a model of the communications system to determine the correct weights to form a beam for transmit signals.

In an array of very widely spaced elements, an exact whole number of wavelengths typically cannot be measured. However, the actual fractional phase difference f can be calculated by generated a steering vector for the actual signal using an adaptive blind source separation (BSS) algorithm, as described below. Therefore, even though the actual value of n is generally unascertainable, the actual value off can be combined with the estimated value of n to allow calculation of a differential distance value for the second antenna element with increased accuracy. This is conceptually described below with respect to FIGS. 12A-12C.

Figure 12A:
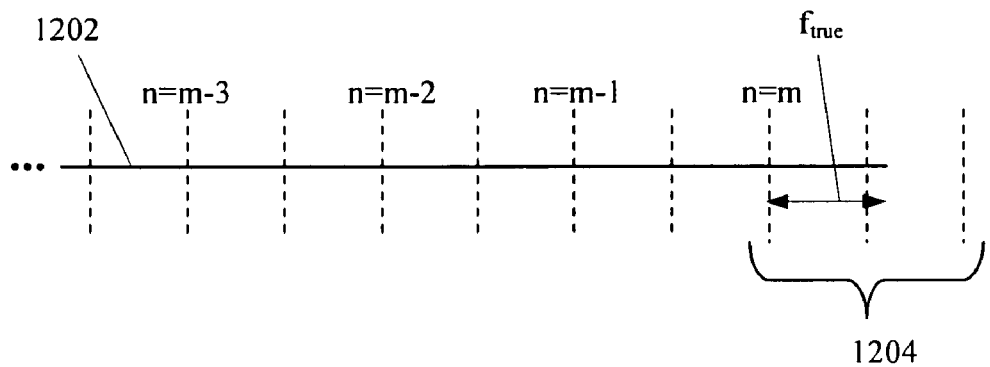
FIG. 12A is a exemplary diagram showing actual phase propagation along a differential distance between a first and a second antenna element in an array and a residual phase value computed according to an embodiment of the present invention.

FIG. 12A shows a schematic of phase propagation 1202 of a signal along a differential distance between a first and a second antenna element. As previously described, as the signal 1202 traverses the differential distance, the signal will undergo some amount of phase propagation $n_{true}+f_{true}$, where $n_{true}$ is equal to an unknown number of whole wavelengths m. Unfortunately, determining a value for m for a received signal is non-trivial. When array element spacing is on order of thousands wavelengths, it is difficult to determine phase to a few degrees, since this amounts to measuring to a few parts per million accuracy. For example, for X-band frequencies, a wavelength is approximate an inch and so accuracies of about 1/100 of an inch are generally needed over an antenna element separation distance of 200 to 300 feet. Although, many surveying techniques (including laser metrology) are accurate to less than one inch over this distance (about one full wavelength), measuring such a delay using such an external source would require a bandwidth of 2 GHz or more to obtain reliable results. This is 3 to 4 orders of magnitude wider than most deep space downlinks. (Although quasars have such bandwidth, they are generally very weak and would require long integration times during which time, array parameters could change.) Although using measurement data is generally prohibitive, since the phase of the as-received signal can generally always be measured, a value for $f_{true}$, commensurate with the final portion 1204 of the phase propagation 1202 of the as-received signal, can generally be determined using an adaptive BSS algorithm, as described below.

Figure 12B:
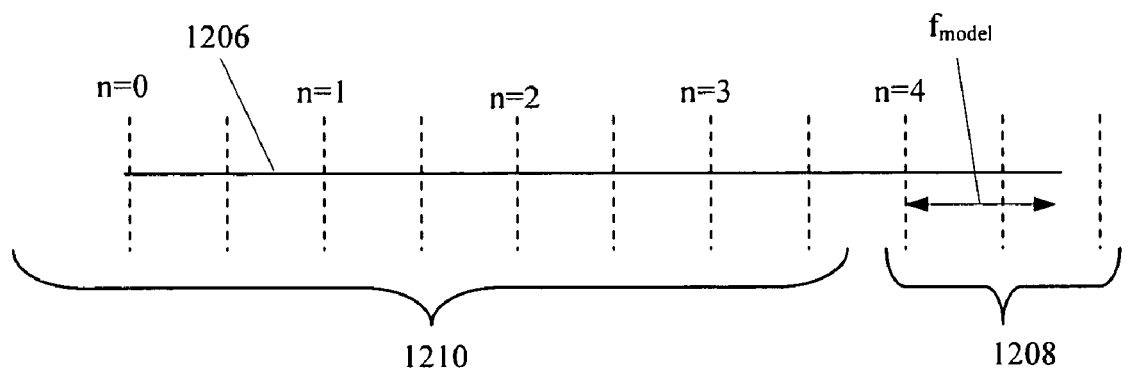
FIG. 12B is a exemplary diagram showing estimated phase propagation along a differential distance between a first and a second antenna element in an array computed according to an embodiment of the present invention.

Additionally, both $n_{true}$ and $f_{true}$ can be modeled to provide modeled values $n_{model}$ and $f_{model}$ for estimating a differential distance, as described above, for the signal in FIG. 12A. FIG. 12B shows a schematic of estimated phase propagation 1206 of the signal in FIG. 12A. Although the estimated phase propagation 1206 can be used to determine an estimated differential distance based on $n_{model}$ and $f_{model}$, the transmission medium variation and antenna element location errors result in a variation of the value of a $f_{model}$ as compared to $f_{true}$. However, even though the portion 1208 of the estimated phase propagation 1206 associated with $f_{model}$ may not be accurate, the portion 1210 of the estimated phase propagation 1240 can be assumed to represent the number of whole wavelengths for the actual phase propagation 1202 in FIG. 12A with a high degree of accuracy. Generally, such an assumption can be made when the error in the location of the antenna elements is within a wavelength. Therefore, in the various embodiments of the present invention, to provide an accurate estimate of the phase propagation and therefore allow computation of an accurate differential distance, the differential distance can be estimated using a combination of $n_{model}$ and $f_{true}$.

Figure 12C:
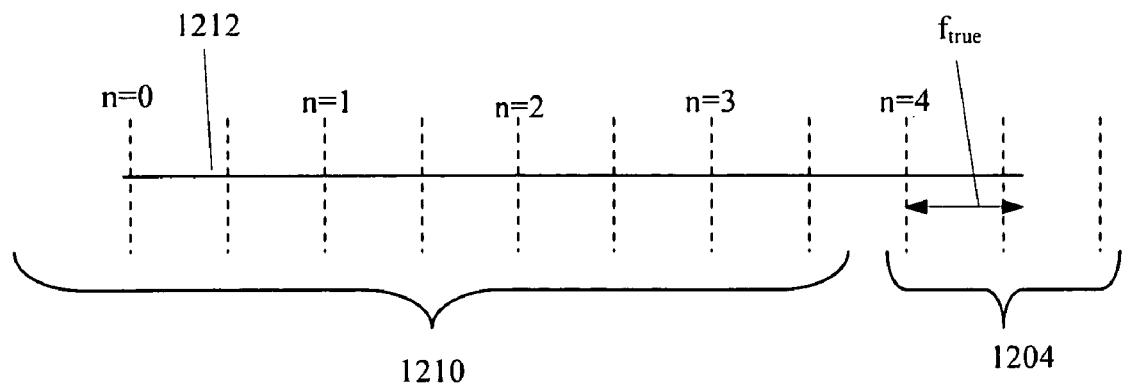
FIG. 12C is a exemplary diagram showing an adjusted or "true" phase propagation along a differential distance between a first and a second antenna element in an array computed according to an embodiment of the present invention.

For example, FIG. 12C shows a schematic of a "true" phase propagation 1212 of the signal in FIG. 12A. To construct phase propagation 1212, the estimated phase propagation 1206 is selected and the portion 1208 is replaced with portion 1204 from phase propagation 1202. As a result, since $n_{model}$ is assumed to be correct and the $f_{true}$ (based on portion 1204) is known, a more accurate estimate of the differential distance can be performed.

In the exemplary replacement process shown in FIGS. 12A-12C above, it is assumed that the $n_{model}$ and $n_{true}$ have the same number of wavelengths. However, the $n_{model}$ value can also be higher or lower than the $n_{true}$ value. Accordingly, to obtain a correct phase propagation (i.e., correct values for computing the sum of $n_{model}$ and $f_{true}$), some additional considerations can be required. If it is assumed that the phase propagation values for the modeled ($n_{model}$, $f_{model}$) and "true" ($n_{true}$, $f_{true}$) phase propagation differ by less than one wavelength, then the difference between the modeled and actual differential distances for an antenna element can be expressed as:

$$|z_{model} - z_{true}| < \frac{1}{2}\lambda \qquad (13)$$

Therefore, the difference in phase ($\phi=z/\lambda$) can be expressed as:

$$|\phi_{model} - \phi_{true}| < \frac{1}{2} \Rightarrow \left|\frac{z}{\lambda}\text{model} - \frac{z}{\lambda}\text{true}\right| < \frac{1}{2} \qquad (14)$$

or $$|(n_{model} + f_{model}) - (n_{true} + f_{true})| = \qquad (15)$$
$$|(n_{model} - n_{true}) - (f_{true} - f_{model})| < \frac{1}{2}$$

Setting $n_{model}-n_{true}=k$ and $f_{true}-f_{model}=p$, Equation (15) reduces to:

$$|k - p| < \frac{1}{2} \qquad (16)$$

where $k \in \{-1, 0, 1\}$.

Using $p=(f_{true}-f_{model})$ and $k=(n_{model}-n_{true})$ $n_{true}$ is obtained since $n_{true}=(n_{model}-k)$ and used to correct the modeled differential distance.

The method of replacement in FIGS. 12A-7C will therefore vary according to the value of k. In the case of k=0, $n_{model}$ and $n_{true}$ are the same, therefore replacement can be performed as described above in FIGS. 12A-7C. In the case of k=1, this means that $n_{model}$ is greater than $n_{true}$. In such a case, the outright replacement of portion 1208 with portion 1204, as described in FIGS. 12A-7C would result in the n value for phase propagation 1210 to be one integer wavelength too high and result in an overestimate of the differential distance. As a result, the combination step would require reducing n by one integer wavelength prior to computing the differential distance. In the case of k=−1, this means that $n_{model}$ is less than $n_{true}$. In such a case, the outright replacement of portion 1208 with portion 1204, as described in FIGS. 12A-12C would result in the n value for phase propagation 1210 to be one integer wavelength too low and result in an underestimate of the differential distance. As a result, the combination step would require increasing n by one integer wavelength prior to computing the differential distance.

Although the determination of adding or removing wavelengths can be performed manually, the process can also be generalized as shown below. Since both $f_{true}$ and $f_{model}$ are known, k can be calculated and $n_{true}$ can be expressed as:

$$n_{true} = n_{model} - k = n_{model\_adjusted} \quad (17)$$

and $n_{model\_adjusted}$ can be calculated as:

$$n_{model\_adjusted} = \text{floor} \frac{\frac{2\pi}{\lambda} \cdot z_{model}}{2\pi} = \text{floor}\left(\frac{f}{c} \cdot z_{model}\right) \quad (18)$$

Using Equations (17) and (18), $n_{model}$ and $n_{true}$ can be calculated and the floor function provides the necessary adjustment to add or remove the additional wavelength. Substituting into $z_2/\lambda_{RX} = n+f$, the "true" value for $z_2$ (i.e., the differential distance for the second antenna element) can be then expressed as:

$$z_{2,true} = \lambda_{RX}(n_{true} + f_{true}) \quad (19)$$

which can be used in equation (12) to provide phase information for the antenna element of interest.

Once the differential distance is calculated, it can be used to provide a phase correction for the signal being transmitted. Referring back to Equation (3), it was noted that for the system in FIG. 11, the phase component describing the difference between antenna elements 1104 and 1106 was described by $$e^{-j\frac{2\pi}{\lambda}D\sin\theta},$$

where $Z = D \sin \theta$. Therefore the phase correction ($\Delta\phi$) for the transmitted signal at a particular AOA can be expressed as:

$$\Delta\phi = e^{-j\frac{2\pi}{\lambda_{Tx}}z_{true}} \quad (20)$$

where $\lambda_{Tx}$ is the wavelength of the transmitted signal. In some embodiments, such a correction can be applied at the beamformer for the antenna element. As additional signals are received at other AOAs, additional phase correction values can be calculated for these AOAs and can also be used to adjust the model-based control system.

Although FIGS. 11A-6B and FIGS. 12A-7C present an example for calculating a phase correction for an antenna element with respect to a reference antenna element, the present invention is not limited in this regard. In the various embodiments of the present invention, the differential distances can be used to update configuration data for a control system controlling the operation of an array of antenna elements to allow phase corrections can be computed for all of the antenna elements. For example, referring back to FIGS. 2-3 the ACS 202 can compute a steering vector for the received signal at all of antenna elements 206a, 206b, 206c, corresponding $f_{true}$ values based on the steering vector, and corresponding differential distance values, as described above Afterwards, during a transmission beamforming operation, the weights $w_1$, $w_2$, $w_3$ will then include phase corrections $\Delta\phi_1$, $\Delta\phi_2$, $\Delta\phi_3$. For example, the transmission weights $w_1$, $w_2$, $w_3$ can provide phase adjustment weights of $\phi_1'$, $\phi_2'$, $\phi_3' = \phi_1 + \Delta\phi_1$, $\phi_2 + \Delta\phi_2$, $\phi_3 + \Delta\phi_3$ for antenna elements 206a, 206b, 206c instead of the standard phase adjustment weights $\phi_1$, $\phi_2$, $\phi_3$. Additionally, as previously described, values for subsequent phase corrections $\Delta\phi_1$, $\Delta\phi_2$, $\Delta\phi_3$ at different AOAs can be computed and used to further adjust the model-based control system of the ACS 202.

Figure 13:
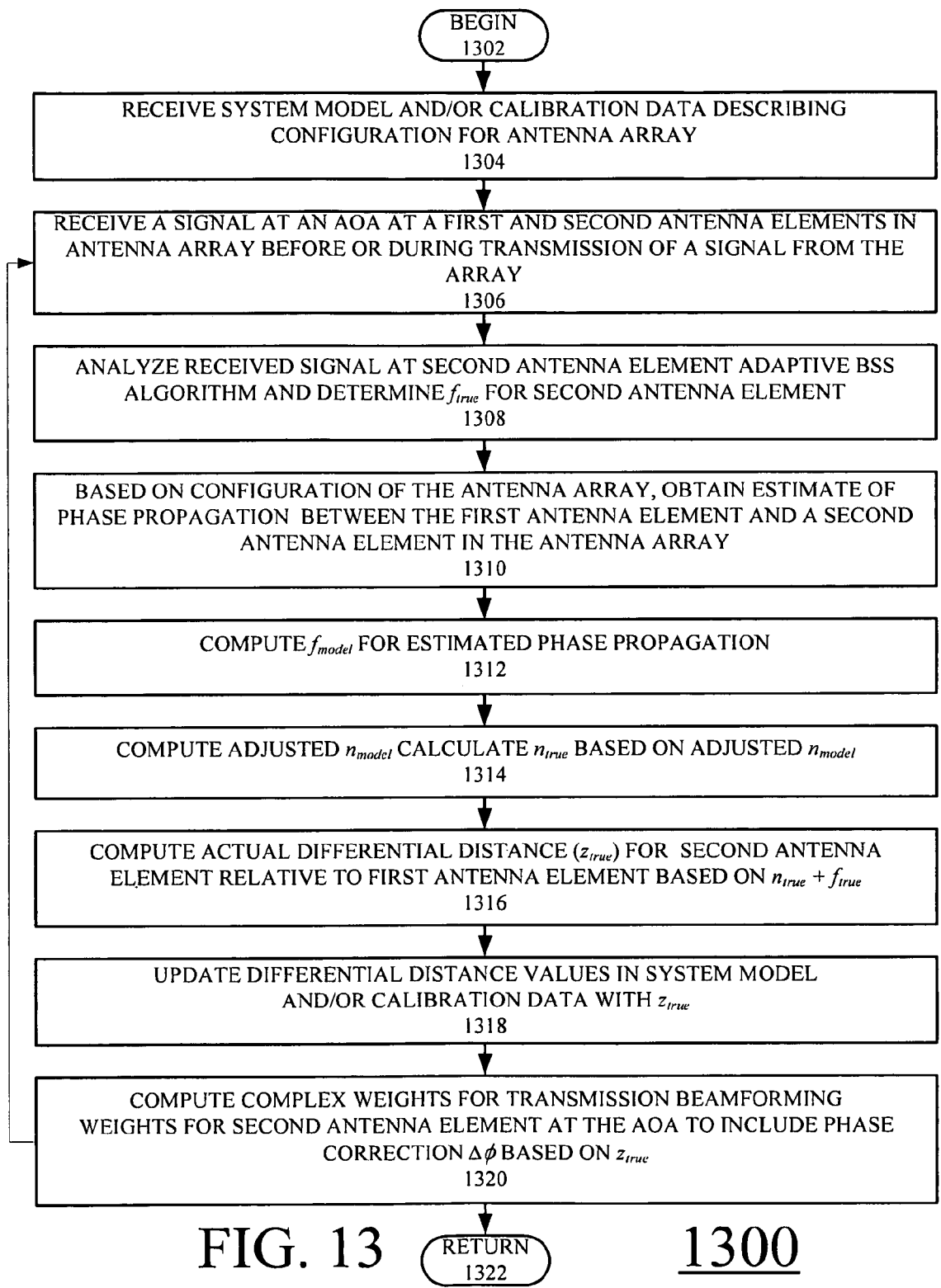
FIG. 13 is a flowchart of steps in an exemplary method for operating an array of antenna element while providing transmission phase corrections in accordance with an embodiment of the present invention

FIG. 13 is a flowchart of steps in an exemplary method 1300 for operating an array of antenna elements in accordance with an embodiment of the present invention. Method 1300 begins at step 1302 and continues on to step 1304. In step 1304 a model of the array or calibration data for the array can be received. The model and/or the calibration data provide a description or configuration of the array that includes or allows estimation of phase center locations for the various elements in the array. The estimation of the phase center location can be based purely on the known physical aspects of the antenna element or based on previously acquired calibration data. However, the present invention is not limited in this regard and the phase center locations can also be based on estimates of phase errors in various portions of the array.

Concurrently or subsequent to step 1304, signal data for at least one signal can be received at first and second antenna elements at step 1306 during a transmission operation. As previously described, this signal can be received from a radiometric source currently within a central beam of array of antenna elements. That is, while communicating with an object of interest within the central beam, signals from radiometric sources that are also within the beam can be used for calculating differential distances. Although such reference objects will not be at the exact center of the central beam, the differences in AOA for such reference objects will generally not be significant enough to cause a miscalculation of the differential distance.

In the various embodiments of the present invention, the term "radiometric source" refers to any object providing radio emissions detectable by the array of antenna elements. For example, these can include artificial objects, such as spacecraft, and celestial objects, such as planets, stars, quasars, and moons emitting detectable electromagnetic energy.

Once the signals are received at step 1306, calculation of the "true" phase propagation can be started. First, at step 1308 the signal received at a second element is analyzed using an adaptive BSS algorithm to determine $f_{true}$, as previously described. In other embodiments, inter-element phase comparison methods can be used to determine the $f_{true}$ values. However, comparison approaches are typically limited in accuracy. For example, the presence of multiple emitters near an antenna element of interest can result interference. Furthermore, if the antenna elements do not operate identically, such methods fail to capture the effect of such variations on $f_{true}$ without performing some amount of signal processing, which reduces the overall signal power available for determining $f_{true}$. BSS methods, however, are not generally affected by such effects and allow $f_{true}$ values to be obtain without the need for significant filtering that can reduce the signal power available. Concurrently or subsequent to step 1308, a configuration of the antenna array, based on calibration data and/or a system model, can be used in step 1310 to determine an estimated phase propagation ($n_{model} + f_{model}$) between the first antenna element and the second antenna element. For purposes of method 1300, it is assumed that the first antenna element is the reference antenna element. The fractional wavelength portion of the estimate phase propagation ($f_{model}$) can then be determined in step 1312.

The estimated phase propagation can then be adjusted in step 1314. As previously described, the estimated phase propagation is adjusted by computing $n_{true}$ from $n_{model}$ according to Equations (17) and (18). The adjusted or "true" phase propagation value ($n_{true} + f_{true}$) can then be used in step 1316 to compute an actual differential distance ($z_{true}$) between the phase center of the first and second antenna elements. In step 1318, the phase of the transmitted signal can be adjusted using the updated calibration data and/or system model. In particular, for the same AOA $z_{true}$ was calculated for, subsequent transmissions will have a phase component adjustment ($\Delta\phi$) equal to $$e^{-j\frac{2\pi}{\lambda_{Tx}} z_{true}}.$$

Finally, in step 1320, any signals transmitted in the same AOA are transmitted to include the phase correction. The method can then end at step 1322 or repeat starting with step 1306 as additional signals are received.

Element Phase Center Correction

As previously described, in some embodiments, improved phase center location information for the elements in the array can be obtained based at least on computed differential distance information for the antenna elements with respect to known radiometric sources, a location or direction of the radiometric sources relative to the antenna array, and a reference antenna element in the array. This permits improved phase center location information to also be obtained based primarily on reception of signals rather than signal transmission and reception to a reference objects, as in long loop methods, and reduce or eliminate latency and availability issues and reducing or eliminating the need to go off-task.

Once the differential distances have been computed each observation, a second aspect of the present invention provides for computing actual phase center locations for each of the antenna elements during each observation. In the various embodiments of the present invention, a system of simultaneous equations is utilized to solve for the actual phase center locations. In particular, the simultaneous equations are configured to solve for k antenna elements and i observations from known sources (e.g. quasars). In order to provide a sufficient number of equations to allow a solution to be found for each observation, $i \geq 3$ since each observation i provides an entire vector of k linear combinations of the 3 spatial parameters X, Y and Z. This is elaborated in detail in the following paragraphs As previously described, the actual or "true" phase of a signal received at an antenna element and a modeled value of this phase will be different due to variations in phase center location. In other words, the modeled phases at the antenna elements can be expressed as:

$$\Phi' = f(\theta_{ik}, \phi_{ik}, x_k, y_k, z_k)_{model} \quad (21)$$

where $(\theta_{ik}, \phi_{ik})$ is the line of sight angles from antenna element, k towards observed signal, i, and $(x_k, y_k, z_k)$ is the modeled phase center location for the $k^{th}$ antenna element for all observations, i. Consequently, the actual or "true" phases are expressed as:

$$\Phi = f(\theta_{ik}, \phi_{ik}, x_k, y_k, z_k, \epsilon_{x_k}, \epsilon_{y_k}, \epsilon_{z_k})_{true} \quad (22)$$

where $(\epsilon_{x_k}, \epsilon_{y_k}, \epsilon_{z_k})$ is the error in the modeled element location for antenna element, k. Therefore, to find a better estimate for the antenna element phase center locations, signals from known locations are observed at different line of sight angles. The various embodiments of the present invention utilize the "true" differential distance data to minimize the difference between $\Phi$ and $\Phi'$.

As described above, the AF vector (Equation (11)) for the steering vector (Equation (10)) describes the phase component of the signal received at each antenna element. Using the form for the phase component for one incoming signal, i, $$e^{-j\frac{2\pi}{\lambda} D\hat{u}}$$

as shown in Equation (23):

$$D = \begin{bmatrix} x_1 & y_1 & z_1 \\ x_2 & y_2 & z_2 \\ \vdots & \vdots & \vdots \\ x_k & y_k & z_k \end{bmatrix} \quad (23)$$

where D is a matrix containing the modeled antenna element phase center locations for each element, k, and $\hat{u}$, is the unit direction vector for the $i^{th}$ observation:

$$\hat{u} = \begin{bmatrix} \sin\theta_i \cos\phi_i \\ \sin\theta_i \sin\phi_i \\ \cos\theta_i \end{bmatrix}. \quad (24)$$

This allows $\Phi'$ to be expressed as:

$$\Phi' = \ln[e^{j\frac{2\pi}{\lambda} D\hat{u}}] \quad (25)$$

Similarly, $\Phi$ which contains the errors in the phase center locations, can be expressed as:

$$\Phi = \ln[e^{j\frac{2\pi}{\lambda} AX}] \quad (26)$$

where X is a matrix $(D+E_D)^T$ containing the actual antenna element phase center locations:

$$X = (D + E_D)^T \quad (27)$$

-continued $$= \left( \begin{bmatrix} x_1 & y_1 & z_1 \\ x_2 & y_2 & z_2 \\ \vdots & \vdots & \vdots \\ x_k & y_k & z_k \end{bmatrix} + \begin{bmatrix} \varepsilon_{x1} & \varepsilon_{y1} & \varepsilon_{z1} \\ \varepsilon_{x2} & \varepsilon_{y2} & \varepsilon_{z2} \\ \vdots & \vdots & \vdots \\ \varepsilon_{xk} & \varepsilon_{yk} & \varepsilon_{zk} \end{bmatrix} \right)^T$$

$$= \begin{bmatrix} x_1 + \varepsilon_{x1} & y_1 + \varepsilon_{y1} & z_1 + \varepsilon_{z1} \\ x_2 + \varepsilon_{x2} & y_2 + \varepsilon_{y2} & z_2 + \varepsilon_{z2} \\ \vdots & \vdots & \vdots \\ x_k + \varepsilon_{xk} & y_k + \varepsilon_{yk} & z_k + \varepsilon_{zk} \end{bmatrix}^T$$

and A is the matrix containing unit direction vectors for each observation, i at each element, k:

$$A = \begin{bmatrix} \sin\theta_{11}\sin\phi_{11} & \sin\theta_{12}\cos\phi_{12} & \cos\phi_{12} \\ \sin\theta_{21}\sin\phi_{21} & \sin\theta_{22}\cos\phi_{22} & \cos\phi_{23} \\ \vdots & \vdots & \vdots \\ \sin\theta_{ik}\sin\phi_{ik} & \sin\theta_{ik}\cos\phi_{ik} & \cos\phi_{ik} \end{bmatrix}. \quad (28)$$

Accordingly, based on the measured differential distances, and the known direction of the signal based on the line of sight angles to each element we can set the product of Equations (27) and (28) equal to a matrix, B containing the result of the BSS algorithm.

$$A^*X^T = B = \begin{bmatrix} \sin\theta_{11}\sin\phi_{11} & \sin\theta_{12}\cos\phi_{12} & \cos\phi_{12} \\ \sin\theta_{21}\sin\phi_{21} & \sin\theta_{22}\cos\phi_{22} & \cos\phi_{23} \\ \vdots & \vdots & \vdots \\ \sin\theta_{ik}\sin\phi_{ik} & \sin\theta_{ik}\cos\phi_{ik} & \cos\phi_{ik} \end{bmatrix} * \quad (29)$$

$$\begin{bmatrix} x_1 + \varepsilon_{x1} & y_1 + \varepsilon_{y1} & z_1 + \varepsilon_{z1} \\ x_2 + \varepsilon_{x2} & y_2 + \varepsilon_{y2} & z_2 + \varepsilon_{z2} \\ \vdots & \vdots & \vdots \\ x_k + \varepsilon_{xk} & y_k + \varepsilon_{yk} & z_k + \varepsilon_{zk} \end{bmatrix}^T$$

$$= \begin{bmatrix} b_{11} & b_{12} & b_{12} \\ b_{21} & b_{22} & b_{23} \\ \vdots & \vdots & \vdots \\ b_{ik} & b_{ik} & b_{ik} \end{bmatrix}$$

Where B contains the actual fractional phase differences, f calculated by generating a steering vector for the actual signal using an adaptive BSS algorithm described below. Another way of saying this is that it returns $\mod_{2\pi}(\vec{d}\hat{u})$, where $\vec{d}\hat{u}$ is the differential distance vector for an element and $b_{ik}$ is the phase difference for the $i^{th}$ observation at the $k^{th}$ element or:

$$b_{ik} = \vec{d}^T \hat{u} = [x_k + \varepsilon_{xk} \quad y_k + \varepsilon_{yk} \quad z_k + \varepsilon_{zk}] * \begin{bmatrix} \sin\theta_{ik}\sin\phi_{ik} \\ \sin\theta_{ik}\cos\phi_{ik} \\ \cos\phi_{ik} \end{bmatrix} \quad (30)$$

or as written in Equation (29):

$$b_{ik} = \hat{u}^T \vec{d} = [\sin\theta_{ik}\sin\phi_{ik} \quad \sin\theta_{ik}\cos\phi_{ik} \quad \cos\phi_{ik}] * \begin{bmatrix} x_k + \varepsilon_{xk} \\ y_k + \varepsilon_{yk} \\ z_k + \varepsilon_{zk} \end{bmatrix} \quad (31)$$

The matrix X can then be solved by conventional matrix methods to compute:

$$X = (A^T A)^{-1} A^T B. \quad (32)$$

Although any plurality of AOAs can be used to determine the phase center locations for the antenna elements, in some embodiments of the present invention, at least three AOAs are needed to accurately determine the phase center locations.

Figure 14:
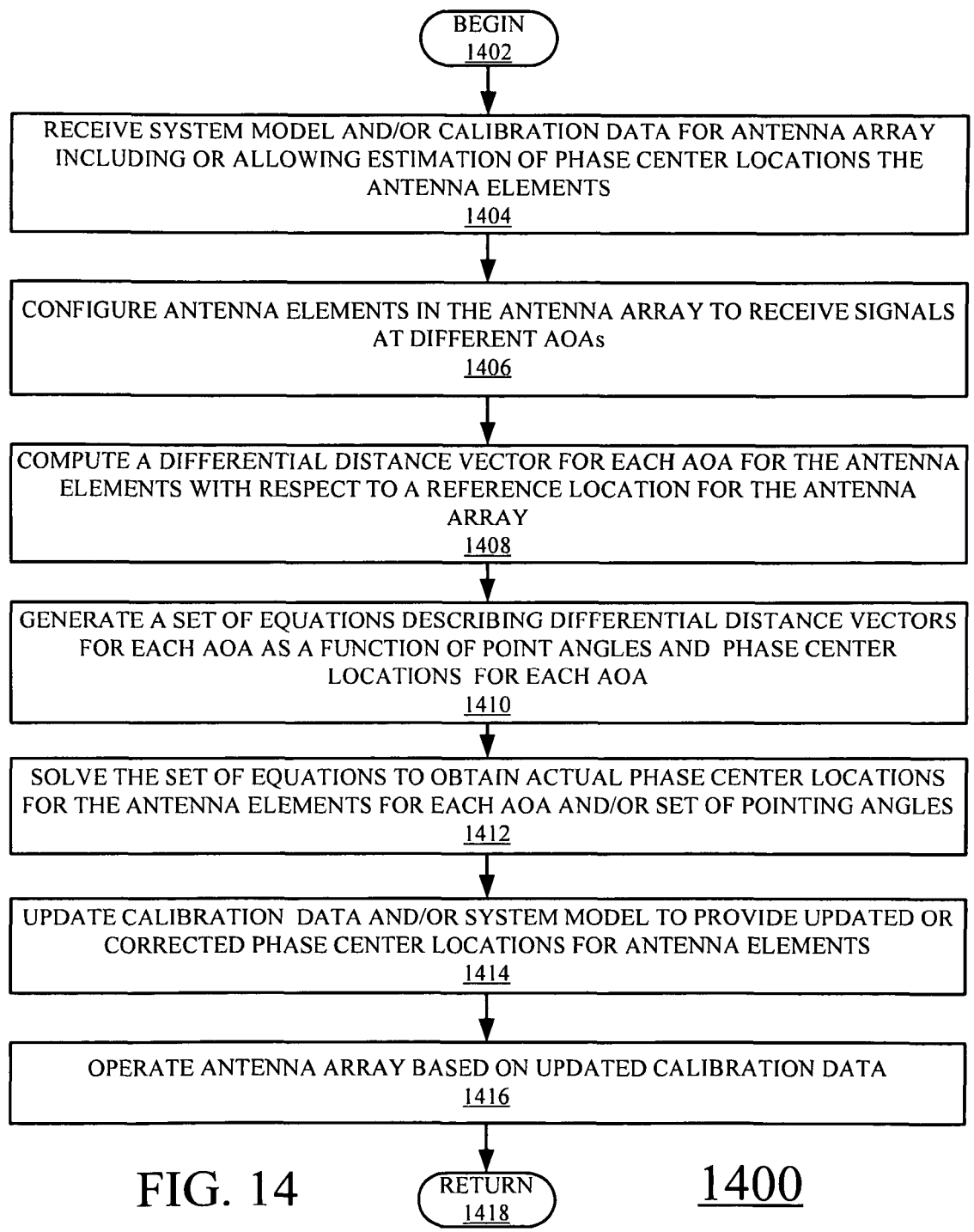
FIG. 14 is a flowchart of steps in an exemplary method for operating an array of antenna elements while providing element phase center corrections in accordance with an embodiment of the present invention.

FIG. 14 is a flowchart of steps in an exemplary method 1400 for operating an array of antenna elements. Method 1400 begins at step 1402 and continues on to step 1404. In step 1404, configuration data for the array of antenna elements can be received, such as a system model or calibration data. The system model and/or the calibration data provide a description or configuration data for the array that includes or allows estimation of the phase center locations and differential distances for the various elements in the array. The estimation of the phase center location and differential distances can be based purely on the behavior and/or orientation of the antenna element. However, the present invention is not limited in this regard and the phase center locations can also be based on estimates of phase errors in various portions of the array.

Concurrently or subsequent to step 1404, the antenna elements in the array can be configured in step 1406 to receive signals at a plurality of different AOAs. That is, as described above from one or more objects at a plurality of locations and at different line of sight angles. For example, as previously described, the antenna elements can be configured to collect signals from different radiometric celestial objects. Furthermore, in the case of directional antenna elements, the antenna elements can be pointed in the direction of the object. For example, in the case of a reflector-type antenna element, the AOA can be based on an elevation and azimuth for the reference object relative to the antenna array.

For each of the signals received in step 1406, a differential distance vector for each antenna element, relative to a reference location, can be calculated in step 1408. In the various embodiments of the present invention, the reference location can be anywhere, including the location of an antenna element. Once the differential distances are obtained in step 1408, a system of equations can be generated in step 1410. In particular, the system of equations provides differential distance vectors as a function of phase center locations and associated pointing angles, as described above with respect to Equations (27) to (32). The system of equations can then be solved in step 1412 using the differential distance vectors calculated in step 1408 and the pointing angles used in step 1406 to obtain the phase center locations, relative to the reference antenna for each set of pointing angles. Afterwards, in step 1414, the calculated values for the phase centers, as a function of AOA, can be used update or provide corrections to the configuration data obtained in step 1404. Based on these updates and corrections, the antenna array can then be operated in step 1416. Previous processing can then be resumed in step 1418, including repeating steps 1404-1418.

The transmission phase correction and phase location calculation processes have been described with the assumption that a single narrowband signal has been received. However, the various embodiments of the present invention are not limited in this regard. In some embodiments, multiple signals can be received along the same central beam. The use of multiple signals allows multiple observations and differential distance calculations to be performed, allowing increased accuracy in the computation of the phase adjustments needed for the antenna elements. Furthermore, in some embodiments, wideband signals can also be utilized. In such embodiments, Frequency-domain analysis synthesis filtering methods can be utilized to divide the wideband signals into a plurality of narrowband ranges. Accordingly, in such embodiments, the number of observations is effectively increased, also increasing the number and accuracy of differential distances calculated. Additionally, such an analysis can be necessary when the error in the location of the antenna elements is greater than one wavelength. Furthermore, when multiple adjacent bands are analyzed, it is also possible to directly calculate the delay at each antenna element and calculate the phase center locations based on such delays instead.

BSS Algorithm for Computing $f_{true}$

As previously described, measurement of $f_{true}$ can be performed using an adaptive BSS algorithm, including open loop and closed loop methods. For example, in a closed loop method, the standard system covariance matrix, $R_x$ for computing the steering vector, is formed from the expected value of the outer product of the input signal vector. If $\vec{x}(t)$ is the vector of inputs from the array elements, then $$\vec{x}(t) = \begin{bmatrix} \sigma_1(t) \\ \sigma_2(t) \\ \vdots \\ \sigma_n(t) \end{bmatrix} + \sum_{i=1,k} m_i(t)\sqrt{P_i}\,\vec{v}_i \qquad (33)$$

where $\sigma(t)$ is the thermal noise for a given input, $m_i(t)$ is the complex modulation for a particular source, P is the source's power and $\vec{v}_i(t)$ is its steering vector. The covariance matrix is calculated by forming the vector outer product and taking an expected value, denoted by E( ) and provides:

$$R_x = E(\vec{x}^*(t)\vec{x}^T(t)) = \sigma^2 + \Sigma P_i \vec{v}_i^* \vec{v}_i^T \qquad (34)$$

The thermal noise matrix is generally of the following form, $$\sigma^2 = \begin{bmatrix} \sigma_1^2 & & & \\ & \sigma_2^2 & & \\ & & \ddots & \\ & & & \sigma_n^2 \end{bmatrix} \qquad (35)$$

while the complex modulation function $m_i(t)$ is defined so that $E[m_i^*(t)m_i(t)]=1$ for a given source and that $E[m_i^*(t)m_j(t)]=0$ for source-to-source cross correlations.

Inspection of $R_x$ shows that the expected value operation removes all source-to-source vector inner and outer cross products. Consequently, one is unable to 'go back' and determine the various signal steering vectors exactly without additional information.

Alternatively, a pair of similar matrices with different information content can be solved simultaneously for the steering vectors. The necessary matrices are obtained without the need for calibration, thus general array control can be accomplished without calibration. Subsequent AOA determination can then proceed on a source-by-source basis, with AOA precision dependent upon calibration, but with graceful degradation versus errors and without catastrophic algorithm failure. Furthermore, the nonuniform thermal matrix can be removed so that the solutions are unbiased, even for very weak LPI signals.

The standard covariance matrix $R_x$ is selected as the primary matrix. At least three methods are known for obtaining a second similar matrix. Probably the simplest conceptually is the delayed covariance, which we refer to as $R_\tau$. One has $$R_\tau = E[x^*(t-\tau)x^T(t)] = h(\tau)\sigma^2 + \sum_{i=1,k} q_i(\tau)P_i\vec{v}_i^*\vec{v}_i^T \qquad (36)$$

In the above, the scalar $h(\tau) \leq 1$. The complex constant, $|q_i(\tau)| \leq 1$ and is dependent upon the source's carrier frequency and time delay. For a narrow band source, $q_i(\tau)$ is simply a phase shift, but sources with modulation also suffer a correlation amplitude loss with increasing delay. Different modulation types produce different q functions. For example, PSK modulation has a q value that linearly decreases with delay, becoming zero at an inverse bandwidth while the q for bandlimited white noise follows a $\sin(x)/x$ variation. The most important discriminant is the phase of q, which in a practical signal environment is virtually always different from source to source. In a Doppler shifted environment, even phase locked sources at different locations will display frequency offsets and thus different q values. Note that $R_\tau(0)=R_x$ (zero correlation delay). Delay values approaching an inverse bandwidth are effective in many applications.

To address the matrices having the diagonal noise terms, consider solving the eigenvalue equation $$R_\tau e = \lambda R_x e. \qquad (37)$$

After regrouping terms and simplifying, $$\sum_{i=1,k} \vec{v}_i^* [\lambda - q_i(\tau)] P_i (v_i^T e) + (\lambda - h)\sigma^2 e = 0. \qquad (38)$$

Again, two solution types are obtained. The solution of interest is from the noise sub-space and is characterized by eigenvectors orthogonal to all of the steering vectors simultaneously. For an N input array and k signals, there are (N−k) such eigenvectors, and they will all have repeat eigenvalues, $\lambda=h$. Multiplying $R_X$ by one of the noise sub-space eigenvectors yields $$\vec{u} = R_x e = \sigma^2 e. \qquad (39)$$

All signal subspace matrices are eliminated from the product because e is orthogonal to all steering vectors. Expanding u provides:

$$\vec{u} = \begin{bmatrix} u_1 \\ u_2 \\ \vdots \\ u_{n1} \end{bmatrix} = \begin{bmatrix} \sigma_1^2 e_1 \\ \sigma_2^2 e_2 \\ \vdots \\ \sigma_n^2 e_n \end{bmatrix}. \qquad (40)$$

Since u and e are known, one can solve for the $\sigma_1^2$ on a term-by-term basis, thus $\sigma_1^2$ is determined. One may now remove $\sigma_1^2$ and $\sigma_{\tau 1}^2$ from $R_x$ and $R_\tau$ respectively, obtaining a set of singular matrices designated T. Note that one degree of freedom is required to solve for $\sigma^2$.

Once the noise terms have been determined, a fundamental process for solving for unbiased steering vector using singular matrices can be used. Let $$T_x = R_x - \sigma^2 = \sum_{i=1,k} P_i \vec{v}_i^* \vec{v}_i^T, \quad (41)$$

and $$T_\tau = R_\tau - h(\tau)\sigma^2 = \sum_{i=1,k} q_i(\tau) P_i \vec{v}_i^* \vec{v}_i^T. \quad (42)$$

If the generalized eigenvectors and eigenvalues are found of the above set of equations. One has:

$$T_\tau e = \lambda T_x e. \quad (43)$$

Expanding Equation (22) therefore provides:

$$\lambda \sum_{i=1,k} P_i \vec{v}_i^* (\vec{v}_i^T e) = \sum_{i=1,k} q_i(\tau) P_i \vec{v}_i^* (\vec{v}_i^T e). \quad (44)$$

which after collecting terms and regrouping yields, $$\sum_{i=1,k} \vec{v}_i^* [\lambda - q_i(\tau)] P_i (\vec{v}_i^T e) = 0. \quad (45)$$

Since the individual steering vectors are independent, each of the terms in the summation must be zero independently. There are two types of solutions. For the trivial solution, $(\vec{v}_i^T e) = 0$ for all steering vectors and the eigenvalue is indeterminate. This is the null sub-space of this system of equations. For an N input array and k signals, this space has dimension (N−k). The second type of solution has $(\vec{v}_i^T e) = 0$ for all steering vectors but one, $v_j$. This remaining term is then satisfied by an associated eigenvalue such that $$\lambda_j = q_j(\tau) \quad (46)$$

This is the signal sub-space of the system of equations, and it has dimension k. The $j^{th}$ steering vector is then obtained by forming the product $$T_x e_j = P_j \vec{v}_j (\vec{v}_j^T e_j) = (\text{scalar}) \vec{v}_j. \quad (47)$$

Normalization removes the scalar, then one can solve for $P_j$ since all other terms in the expression are known.

The preliminary step of solving for the noise covariance matrix in (40) and removing it in (41) are very important steps in obtaining the exact result of (47). In a practical system, the diagonal noise matrix always has different values for each input and thus cannot equal the identity matrix times a scalar. Eigenvector decomposition of a practical noise covariance matrix in combination with signal covariances can not be decomposed into exact signal and noise sub-spaces unless the diagonal noise matrix equals the identity times a scalar. Thus, without correction, competing algorithms such as MUSIC (MUltiple SIgnal Characterization) produce biased steering vector estimates. Practically, this limitation prevents those algorithms from finding and characterizing weak signals.

Although one procedure for obtaining a steering vector has been described above in detail, embodiments of the present invention are not limited in this regard. In other embodiments of the present invention, other methods for obtaining a second covariance matrix are also suitable, including polarization and fourth order co-variance methods, such as cumulant-based methods.

Model-Based Calibration

As previously described, physical systems are generally controlled using either model-based approaches or calibration data-based approaches. In the case of calibration data-based control, control signals are generated based on a table of measurement values for each measurement parameter. Typically, these would be generated using a finite set of measurements over the range of the parameter of interest after installation of the physical system allowing the physical system to be calibrated to account for systematic variations due to installation or other local factor. In operation, response of the system for a particular parameter value would be obtained by table lookup. Response values for parameter quantities not measured are typically obtained by some type of interpolation using nearby measured points (e.g., Linear Interpolation, Cubic Spline, Fourier, or Polynomial expansions). However, the accuracy of a calibration data-based approach is limited by the fact that the accuracy of measured calibration values is limited by the noise inherent in physical system and the accuracy of the interpolation method. Therefore, if a set of calibration data is obtained that has a high degree of noise in the measured values, accurate control of the system is difficult.

In a model-based control system, the underlying function associated with the measured parameter may be well-defined, so noise is typically not an issue. Furthermore, since the control signals are based upon the underlying function, the need for interpolation is generally reduced or eliminated. However, in a model-based control system, the underlying function is generally responsive to one or more unknown parameters, typically based on an initial set of measurements performed during installation or initial calibration of the physical system. Consequently, any error in obtaining the initial calibration data and/or configuring the model-based control system can result in an inaccurate control of the system.

To overcome the limitations of conventional control system methods, embodiments of the present invention provide a model-based calibration systems and methods. That is, the systems and methods described herein utilized a model-based approach for control of the physical system, as described above, but model parameters are dynamically adjusted to improve the accuracy of the model. In particular, measured output parameters of the physical system are compared with estimated output parameters and based on their difference, updated model parameters are generated. Such an approach provides the advantages of low-noise and well-defined behavior of the physical system provided by model-based approaches and the ability to account for systematic variations in the installed physical system provided by calibration-data based approaches.

Figure 15:
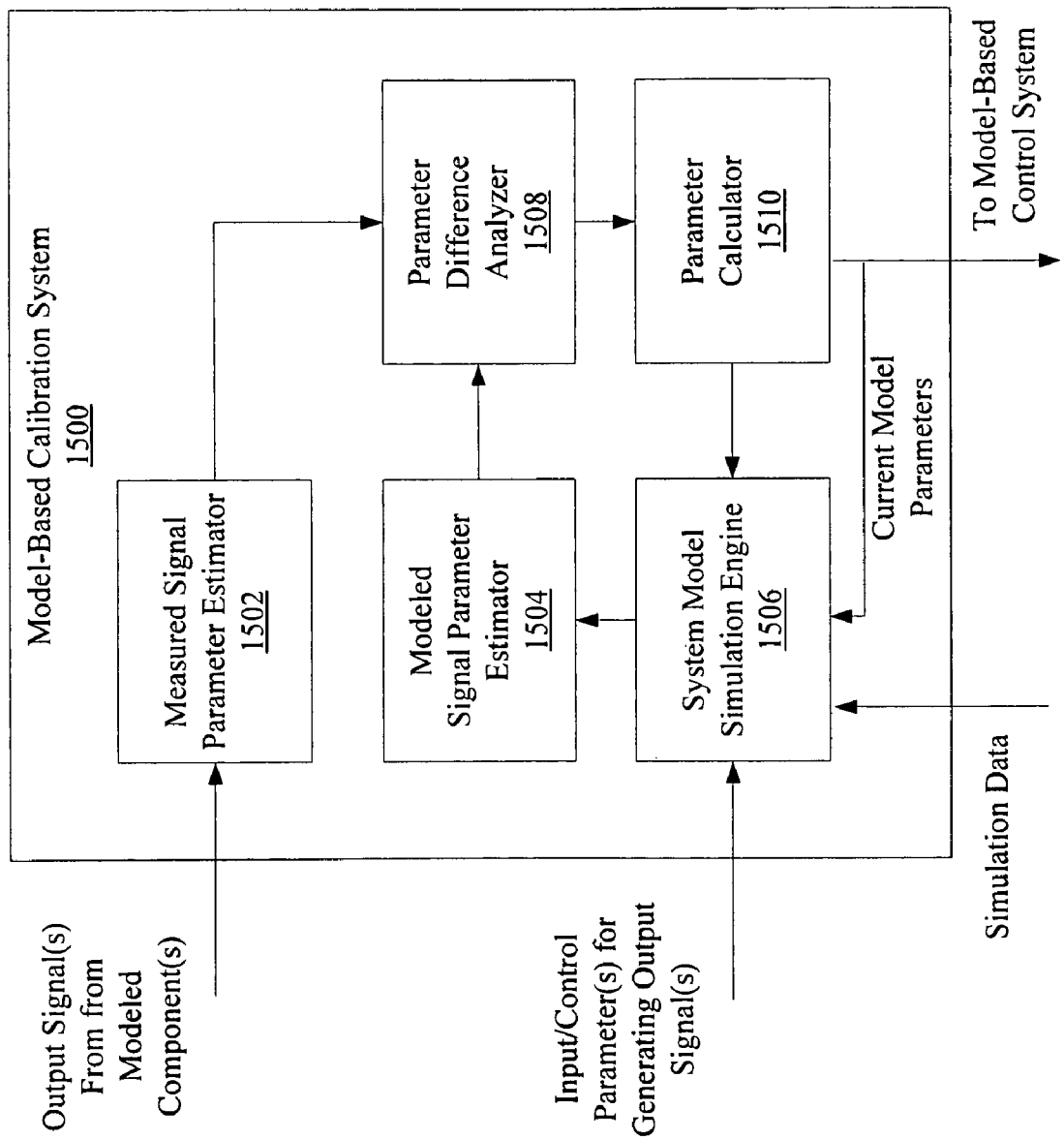
FIG. 15 is a schematic illustration of an exemplary model-based calibration system in accordance with an embodiment of the present invention.

FIG. 15 is a schematic illustration of an exemplary model-based calibration system 1500 in accordance with an embodiment of the present invention. The system 1500 can include a measured signal parameter estimator (SPE) 1502 for receiving output signals from the physical system. In the various embodiments of the present invention, the output signal can include not only an output signal associated with an end result of the physical system, but can also input output signals associated with one or more intermediate results of the physical system and/or measurements obtained from or at various components of the system. The measured SPE 1502 can also generate or compute one or more system parameters for characterizing the physical system based on the output signals received by the measured SPE 1502. For example, in a communications system using an array of antenna elements, measurements of signal phases or differences in signal phases at each of antenna elements can be received as output parameters. Consequently, the measured SPE 1502 can generate system parameters based on such as signal covariance matrix coefficients, signal angle-of-arrival (AOA), or signal steering vectors, to name a few.

The system can also include a modeled SPE 1504 for generating values for the same system parameters based on a modeled output signal generated by a system model simulation engine (SMSE) 1504 in the system 1500. The SMSE 1506 is also configured to receive signals indicating the input or control parameters used for generating the output signals received by the measured SPE 1502 and for receiving simulation data for generating the modeled output signal.

Input parameters for the SMSE 1506 can include active input values provided to the system by a user or a particular component or function of the system. For example, in the case of a communications system comprising an array of antenna elements, input parameters can include amplitude, phase variation, azimuth, and elevation, to name a few. The input parameters can also include passive input parameters. Such passive input parameters can include, for example, environmental parameter values, such as temperature, pressure, and humidity, or other input parameters based on conditions in or around the physical system. However, embodiments of the present invention are not limited to solely for use with physical systems having the input parameters listed above. Rather, in the various embodiments of the present invention, the SMSE 1506 can be used to simulate any type of systems affected by any number and type of input parameters, including biological, mechanical, chemical, or electromagnetic parameters.

As shown in FIG. 15, the SMSE 1506 can also received simulation data. The simulation data received by the SMSE 1506 can include a computer simulation model of the physical system and initial model parameters for the computer simulation model. In the various embodiments of the present invention, the computer simulation model can include models for describing the behavior of any number and types of components in the physical system, including components affected by biological, mechanical, chemical, or electromagnetic parameters. Accordingly, based on the computer simulation model and the input parameters for the output signal, the SMSE 1506 estimates the output signals of the physical system for the modeled SPE 1504.

The estimates of the system parameters generated by the measured SPE 1502 and the modeled SPE 1504 can then be compared in the parameter difference analyzer (PDA) 1508. The PDA 1508 calculates a difference between the modeled and measured values of the system parameters and provides the difference to the parameter calculator 1510. For example, the PDA 1508 may find a difference between measured and modeled signal strength and/or phase at a point between a control system and an antenna element in a communications system. The parameter calculator can then compute a new set of model parameters to minimize the differences computed at the PDA 1508 so as to increase the accuracy of the model. That is, to adjust the model to improve agreement to the system parameters generated by the measured SPE 1502. In some embodiments, the new model parameters can be directly calculated if the mathematical model of the physical system is sufficiently simple and the number of model parameters is sufficiently low. For example, in a physical system including only a few components, the model parameters can be directly calculated. However, as the complexity or non-linearity of the system increases, finding a solution using a direct method becomes increasingly computationally intensive and therefore impractical even when large computing resources are available. As a result, such complex systems generally require the use of iterative methods to find an approximate value for the model components, especially when the number of model parameters is large. That is, the model parameters are computed to minimize difference between the measured and modeled system parameters. In such embodiments, numerical gradient and steepest descent algorithms can be applied.

The new model parameters generated by the parameter calculator 1510 can then be provided to a control system (not shown) for generating new input parameters for the physical system. Additionally, the new model parameters are provided to the SMSE 1506 to update the model being used for generating subsequent modeled output signals for the system 1500. As a result, the model parameters controlling for the physical system are dynamically updated as additional output signals are generated by the system.

As a result, control of the physical system is provided that includes the benefits of calibration data-based control techniques (i.e., accounting for systematic variations in the behavior of the physical system) and model-based control techniques (i.e., well-defined system behavior). Furthermore, if the model parameters are allowed to be dynamically updated over a period of time, the model will become increasingly accurate over time. As a result, the amount of computations required during later updates of the model is significantly reduced and the physical system effectively operates as a purely model-based control system.

For example, a model-based calibration control was implemented for an exemplary interferometer system consisting of two microstrip patch antenna elements mounted on a large conical ground plane. In the exemplary system, the function describing the output power of the antenna elements was the electrical sum of the output power of the two elements as the incidence angle of the source was varied over a 65 degree azimuth range.

When such a system is controlled using a calibration data-based method, a large number of data points (typically tens of thousands of points) would need to be taken over the elevation and azimuth space of interest, each of which contains some amount of measurement error. As a result, the calibration data-based approach, as previously described, is limited by the accuracy of the measurements. A purely model-based control approach, based solely on pre-determined knowledge of the cone angle, the location of the elements on the cone, and the element patterns on a cone also provides only limited accuracy.

When a pre-defined model control system was applied, the measured and modeled output results varied significantly. Two model discrepancies primarily accounted for the difference between measured and modeled results: (1) the antenna element patterns did not include the effect of a conical ground plane, and (2) the locations of the elements were inaccurate in the model. Although the locations of the element could be more precisely measured to improve accuracy of the modeled output, these measurements will always include some amount of error. Furthermore, determining a correct value for the model parameters that account of the effect of the conical ground plane is non-trivial.

However, when utilized with a model-based calibration system in accordance with an embodiment of the present invention, the Present Inventors found that model parameters were quickly obtained that provided good agreement between modeled and measured output. During operation, the model-based calibration system initially adjusted element position parameters for the model of the interferometer system, which provided an improved agreement between measured and model results. As the number of data samples acquired was increased, even better agreement between measured and modeled output results were obtained as the model parameters were further adjusted. After these adjustments, the calibrated model predicted array performance in two scan dimensions (elevation and azimuth) with an insignificant amount of error as compared to calibration data-based or model-based control methods. Furthermore, once the model parameters were adjusted by the model-based calibration system, little or no additional adjustments to the model parameters were needed, reducing the need for iterative computations. Accordingly, the control system for the interferometer system was provided with a model calibrated with a substantially lower number of measurements than required for a calibration data-based approach. In general, the number of measurements needed for calibrating a model is dependent on the difference between the initial set of model parameters and the final set of model parameters. Therefore, the closer the approximation provided by the computer simulation model using the initial set of model parameters is to the actual output of the physical system, the lower is the number of measurements needed to obtain a final set of model parameters. In any case, the number of measurements needed for a model-based calibration in accordance with an embodiment of the present invention is at least one order of magnitude lower than the number of measurements required for a conventional calibration-based control system.

Figure 16:
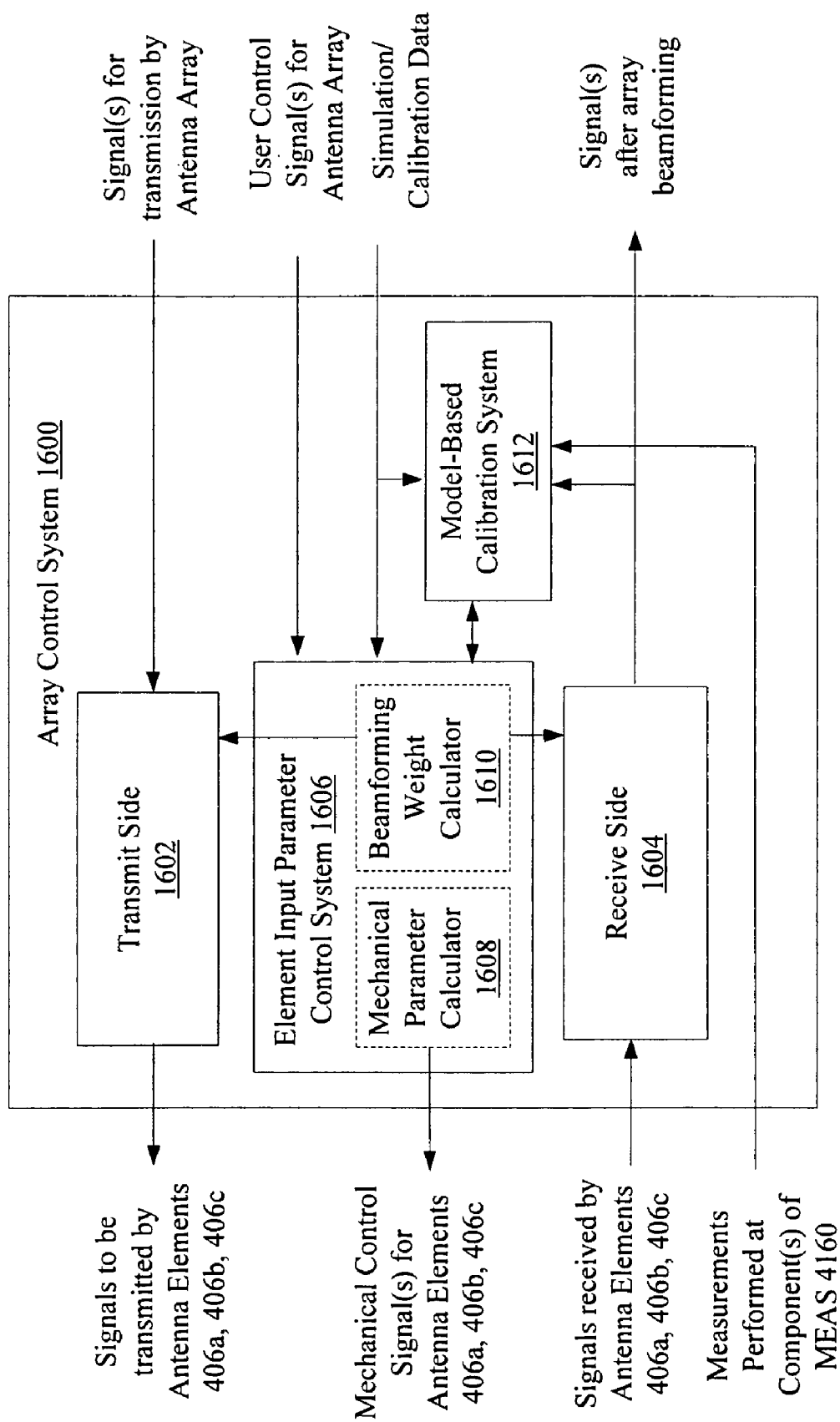
FIG. 16 is a block diagram of the array control system shown in FIG. 2 configured for model-based control and including a model-based calibration system in accordance with an embodiment of the present invention.

The MBCS 1500 can be used to provide model based calibration for an ACS having a model-based control system. FIG. 16 is a block diagram of an ACS 1600 configured for model-based control and including a model-based calibration system in accordance with an embodiment of the present invention. The exemplary ACS 1600, as shown in FIG. 16, also includes a model-based calibration system (MBCS) 1612 and an element input parameter control system (EIPCS) 1606. The MBCS 1612 in FIG. 16 is configured to receive simulation data, as previously described with respect to FIG. 1, including a computer simulation model of the MEAS 250 and an initial set of model parameters for the computer simulation model. The MBCS 1612 in FIG. 16 can be configured to receive the signal received by the antenna elements before and/or after beamforming in the receive side. Additionally, the MBCS 1612 can be configured to receive other input data from the MEAS 250 to utilize during modeling of output signals. For example, in the case of the MEAS 250, such measurements can include temperature measurements, signal phase measurements, or signal phase differences along different portions of the MEAS 250, to name a few. However, the other input data received by the MBCS 1612 can also include any type of environmental, mechanical, or electromagnetic measurements performed in the MEAS 250. The MBCS 1612 can be operated, as previously described with respect to FIG. 1, to provide updated model parameters for the EIPCS 1606.

The EIPCS 1606, operates as a model-based control system utilizing the model parameters provided by the MBCS 1612 to control operation of the transmit side 1602, the receive side 1604, and other operations of the MEAS 250. The EIPCS 1606 can receive control signals defining how the MEAS 250 is to be operated. For example, signals indicating a direction, frequency, or other transmission or reception parameters for the MEAS 250. Based on the control signals, the computer simulation model for the MEAS 250, and the current model parameters computed by the MBCS 1612, the EIPCS 1606 can generate the appropriate signals for the MEAS 250. For example, as shown in FIG. 16, the EIPCS 1606 can include a mechanical parameter calculator 1608 for generating signals for adjusting mechanical motion of components in the MEAS 250, such as an azimuth and elevation for the antenna elements 206a, 206b, 206c. The EIPCS 1606 can also include a beamforming weight calculator 1610 for computing weights for the transmit side 1602 and/or the receive side 1604. Operation of a beamforming weight calculator 1610, based on antenna system information from a model or calibration data is well-known to those of ordinary skill in the art and will not be described herein. Additionally, as the EIPCS 1606 adjusts operation of the MEAS 250, the control signals generated by the EIPCS 1606 can also be provided to the MBCS 1612 in order to adjust the model parameters.

Figure 17:
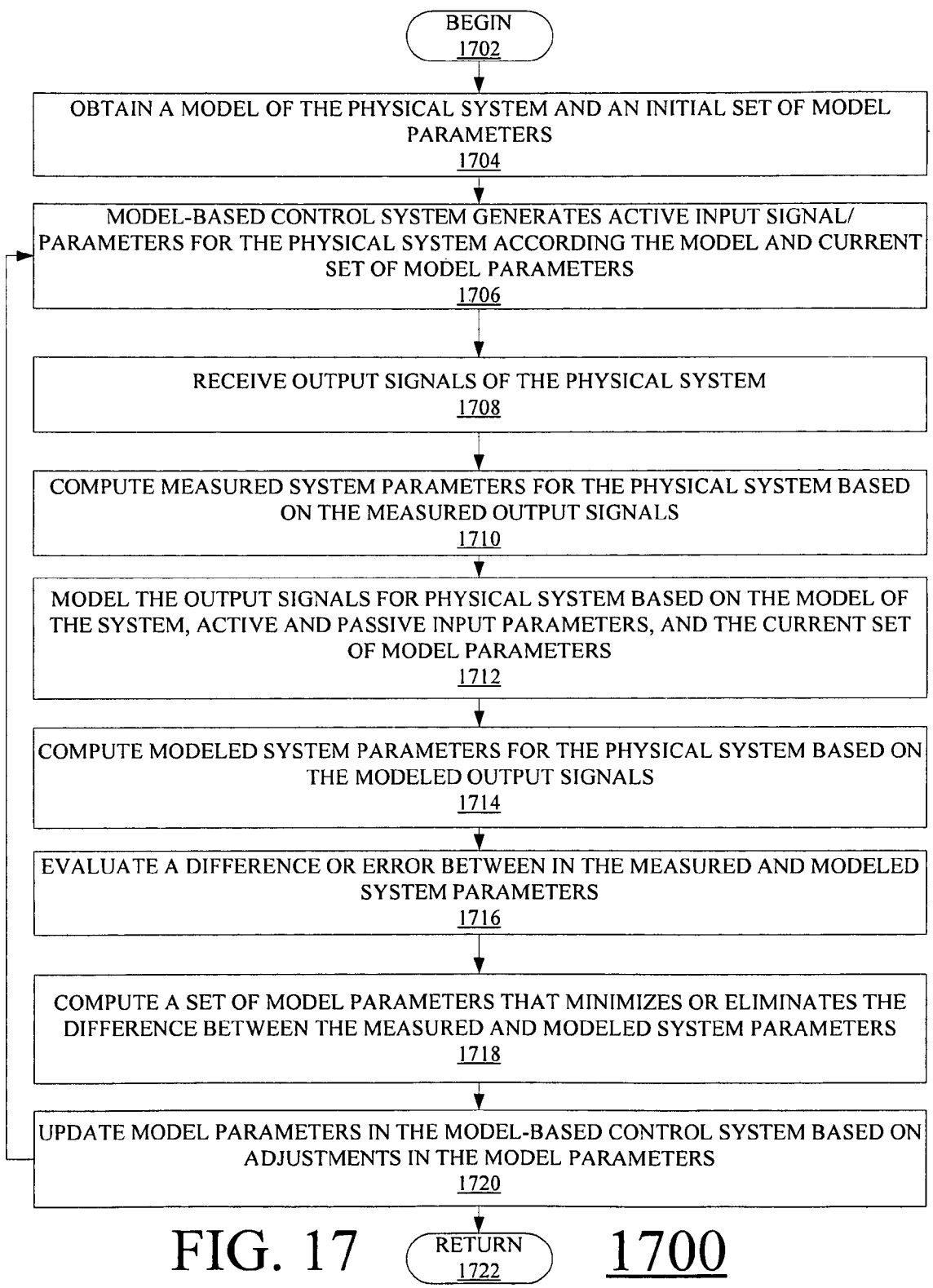
FIG. 17 is a flowchart of steps in an exemplary method for operating an array of antenna element according to an embodiment of the present invention.

FIG. 17 is a flowchart of steps in an exemplary method 1700 for operating a system using a model-based calibration technique in accordance with an embodiment of the present invention. The method can begin in step 1702 can continue on to step 1704. In step 1704, an initial computer simulation model of the physical system to be controlled and an initial set of model parameters can be received. Using the computer model and current model parameters, a set of active input or control signals for the physical system can be generated at step 1706.

At step 1708, the output signals generated by the physical system in response to the active input signals generated at step 1706 and any passive input control signals are measured. Afterwards, at step 1710, the measured system parameters can be calculated from the output signals measured at step 1708. Subsequently or in combination with step 1708, modeled output signals are generated at step 1712 and modeled system parameters are generated at step 1714. The modeled output signal can be generated using a computer simulation model of the physical system using the input signals generated at step 1706 and any other input signals (active or passive) or parameters affecting the physical system. The modeled system parameters can be generated at step 1714 in the same way the measured system parameters are generated in step 1710.

Once the measured and modeled system parameters are generated at steps 1710 and 1714, the difference between the parameters can be computed at step 1716. That is, for each parameter being measured, the error in the model, due to the current set of model parameters, is calculated. Afterwards, in step 1718, the adjustment needed for one or more model parameters is calculated to reduce the difference at step 1716 is computed. As previously described, direct or iterative methods can be used at step 1718, depending on the complexity of the physical system. The model parameters for the model of the physical system used by the control system for the physical system are then updated at step 1720. The method 1700 can then repeat starting at step 1706, to provide further refinement of the model parameters based on subsequent performance of the physical system.

Figure 18:
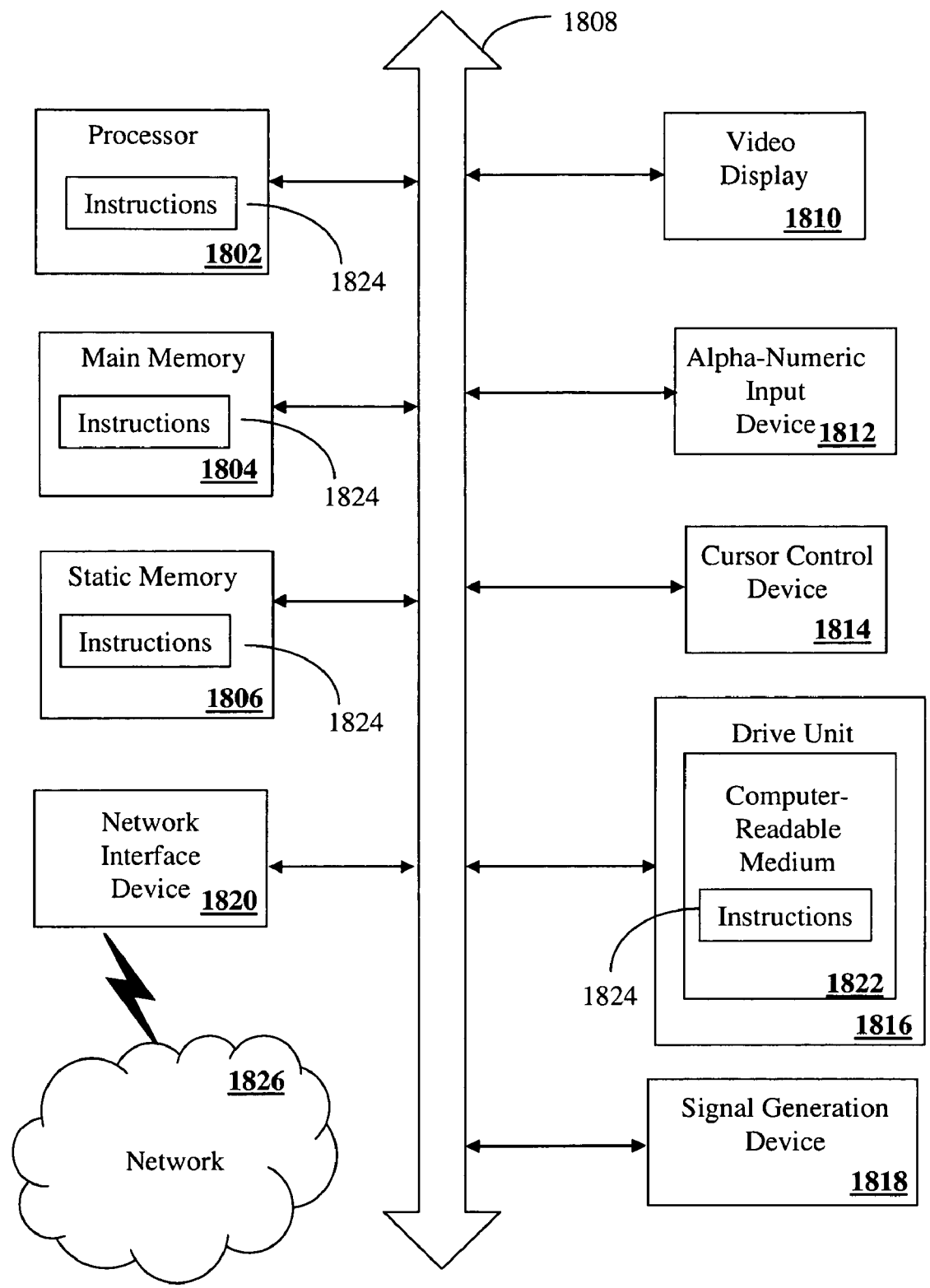
FIG. 18 is a schematic view of a computer system within which a set of instructions operate according to an embodiment of the present invention.

FIG. 18 is a schematic diagram of a computer system 1800 for executing a set of instructions that, when executed, can cause the computer system to perform one or more of the methodologies and procedures described above. For example, the computer system can include functional or processing blocks associated with the function of an ACS configured as in FIG. 3 or FIG. 16. In some embodiments, the computer system 1800 operates as a standalone device. In other embodiments, the computer system 1800 can be connected (e.g., using a network) to other computing devices. In a networked deployment, the computer system 1800 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 1800 can include a processor 1802 (such as a central processing unit (CPU), a graphics processing unit (GPU, or both), a main memory 1804 and a static memory 1806, which communicate with each other via a bus 1808. The computer system 1800 can further include a display unit 1810, such as a video display (e.g., a liquid crystal display or LCD), a flat panel, a solid state display, or a cathode ray tube (CRT)). The computer system 1800 can include an input device 1812 (e.g., a keyboard), a cursor control device 1814 (e.g., a mouse), a disk drive unit 1816, a signal generation device 1818 (e.g., a speaker or remote control) and a network interface device 1820.

The disk drive unit 1816 can include a computer-readable storage medium 1822 on which is stored one or more sets of instructions 1824 (e.g., software code) configured to implement one or more of the methodologies, procedures, or functions described herein. The instructions 1824 can also reside, completely or at least partially, within the main memory 1804, the static memory 1806, and/or within the processor 1802 during execution thereof by the computer system 1800. The main memory 1804 and the processor 1802 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 1824 or that receives and executes instructions 1824 from a propagated signal so that a device connected to a network environment 1826 can send or receive voice and/or video data, and that can communicate over the network 1826 using the instructions 1824. The instructions 1824 can further be transmitted or received over a network 1826 via the network interface device 1820.

While the computer-readable storage medium 1822 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for operating a communications system, said communication system comprising a plurality of antenna elements, an array control system having a plurality of beamformers for said plurality of antenna elements, and a plurality of communications links between said control system and said plurality of antenna elements, the method comprising:
   computing, by said communication system, a plurality of complex weights to be applied to a plurality of transmit signals and a plurality of receive signals by said plurality of beamformers, said plurality of complex weights generated using configuration data for said communications system;
   dynamically determining an electrical length of a communication path between an antenna controller and an antenna element of said plurality of antenna elements during transmit/receive operations performed by said communications system, said electrical length determined by
   measuring a first phase of a communication signal at a first location along a first communication path of a plurality of communication paths, and a second phase of said communication signal at a second location different from said first location along said first communication path, and
   determining a first phase offset between a phase of a first reference signal and said first phase of said communication signal, and a second phase offset between a phase of a second reference signal and said second phase of said communication signal;
   dynamically determining a first variable weight correction for a first plurality of weight corrections based on said first and second phase offsets;
   applying said first variable weight correction to a first one of said plurality of complex weights for counteracting phasing errors occurring in said first communication path of said plurality of communication paths;
   dynamically determining a second plurality of weight corrections;
   applying said second plurality of weight corrections to said plurality of complex weights; and
   subsequent to applying said second plurality of weight corrections to said plurality of complex weights, combining said plurality of complex weights with said plurality of transmit signals so as to improve beam formation of an antenna array;
   wherein each of said plurality of communication paths exist between said control system and a respective one of said plurality of antenna elements, and the phases of the first and second reference signals are the same.

2. The method of claim 1, further comprising:
   sensing a forward signal propagated over a transmission media in a forward direction;
   sensing a reverse signal propagated over said transmission media in a reverse direction opposed from said forward direction, said reverse signal being a reflected version of said forward signal;
   generating said first reference signal, at a first location along a transmission path, using said forward and reverse signals;
   generating said second reference signal, at a second location along the transmission path which is different from said first location, using the forward and reverse signals.

3. The method of claim 2, wherein said generating said first or second reference signal further comprises:
   generating a sum signal by adding the forward and reverse signals together and a difference signal by subtracting the reverse signal from the forward signal;
   generating a first exponentiation signal by multiplying the sum signal by itself, and a second exponentiation signal by multiplying the difference signal by itself; and
   subtracting the first exponentiation signal from the second exponentiation signal to obtain the first or second reference signal.

4. The method of claim 1, further comprising:
   sensing a forward signal propagated over a transmission media in a forward direction;
   sensing a reverse signal propagated over said transmission media in a reverse direction opposed from said forward direction, said reverse signal being a reflected version of said forward signal;
   generating said first reference signal, at a first location along a transmission path, using said forward and reverse signals;
   generating said second reference signal, at a second location along the transmission path which is different from said first location, using the forward and reverse signals;
   combining, at an antenna element, a receive signal of said plurality of receive signals with the first reference signal to obtain a modified receive signal;
   determining, at the second location along said transmission path, a phase offset using the modified receive signal and the second reference signal; and
   adjusting, at the second location along said transmission path, a phase of a modified receive signal using the phase offset to obtain a phase adjusted communication signal.

5. The method of claim 1, wherein said determining said second plurality of weight corrections further comprises:
   for at least a first antenna element of said plurality of antenna elements, identifying an actual fractional wavelength value ($f_{true}$) for at least a first receive signal of said plurality of receive signals;
   obtaining an estimated phase propagation ($n_{model} + f_{model}$) of said first receive signal traversing a distance relative to a reference location based on configuration data for said plurality of antenna elements;

determining an actual differential distance ($z_{true}$) for said first antenna element relative to a reference location using said actual fractional wavelength value ($f_{true}$) and said estimated phase propagation ($n_{model}+f_{model}$); and estimating said second plurality of weight corrections based on the actual differential distance ($z_{true}$).

6. The method of claim 1, further comprising:

calculating a plurality of relative phase center locations for said plurality of antenna elements based on phase differences at said plurality of antenna elements; and updating said configuration data based on said plurality of relative phase center locations.

7. The method of claim 6, wherein said plurality of relative phase center locations are computed by:

calculating a plurality of differential distance vectors for said plurality of antenna elements, each of the plurality of differential distance vectors associated with one of said plurality of receive signals; and computing said plurality of relative phase center locations using a system of equations describing the plurality of differential distance vectors.

8. The method of claim 1, further comprising:

generating a first estimate of at least one first system parameter for said communication system using a computer simulation model and a plurality of model parameter values;

generating a second estimate of said first system parameter using measured values for second system parameters of said communication system;

comparing said first estimate to said second estimate; and adjusting said configuration data based on results of said comparing.

9. The method of claim 8, wherein said configuration data is adjusted by updating said plurality of model parameter values to minimize a difference between said first and second estimates.

10. A communications system comprising:

a plurality of antenna elements, an array control system having a plurality of beamformers for said plurality of antenna elements;

a processing element for computing a plurality of complex weights to be applied to a plurality of transmit signals and a plurality of receive signals by said plurality of beamformers, said plurality of complex weights based at least on configuration data for said communications system;

a plurality of communications links between said array control system and said plurality of antenna elements; and at least one closed loop operator coupled to at least said plurality of antenna elements and said array control system, said closed loop operator comprising at least one comparator configured to determine a first phase offset between a phase of a first reference signal and a first phase of a communication signal, and a second phase offset between a phase of a second reference signal and a second phase of said communication signal, said first phase of said communication signal obtained at a first location along a first communication path of said plurality of communication paths, and said second phase of said communication signal obtained at a second location different from said first location along said communication path;

a controller configured to determine a first variable weight correction of a first plurality of weight corrections for counteracting phasing errors occurring in a first communication path of a plurality of communication paths, each existing between said control system and a respective one of said plurality of antenna elements, said first variable weight correction determined based on said first and second phase offsets, and a beamformer configured to apply said first variable weight correction to a first one of said plurality of complex weights, and wherein said array control system is further configured to detect phase differences at said plurality of antenna elements based on said plurality of receive signals, and apply a second plurality of weight corrections to said plurality of complex weights, said second plurality of weight corrections determined based on said phase differences.

11. The communications system of claim 10, further comprising at least one reference signal generator configured to sense a forward signal propagated over a transmission media in a forward direction, sense a reverse signal propagated over said transmission media in a reverse direction opposed from said forward direction, said reverse signal being a reflected version of said forward signal, generating said first reference signal, at a first location along a transmission path, using said forward and reverse signals, generating said second reference signal, at a second location along the transmission path which is different from said first location, using the forward and reverse signals.

12. The communications system of claim 11, wherein the first or the second reference signal is generated by:

generating a sum signal by adding the forward and reverse signals together and a difference signal by subtracting the reverse signal from the forward signal;

generating a first exponentiation signal by multiplying the sum signal by itself, and a second exponentiation signal by multiplying the first difference signal by itself; and subtracting the first exponentiation signal from the second exponentiation signal to obtain the first or second reference signal.

13. The communications system of claim 10, further comprising at least one reference signal generator configured to sense a forward signal propagated over a transmission media in a forward direction, sense a reverse signal propagated over said transmission media in a reverse direction opposed from said forward direction, said reverse signal being a reflected version of said forward signal, generating said first reference signal, at a first location along the transmission path, using said forward and reverse signals, generating said second reference signal, at a second location along the transmission path, using said forward and reverse signals;

wherein the closed loop operator is further configured to combine at an antenna element a receive signal of said plurality of receive signals with the first reference signal to obtain a modified receive signal, determine, at the second location along said transmission path, a phase offset using the modified receive signal and the second reference signal, and adjust, at the second location along said transmission path, a phase of a modified receive signal using the phase offset to obtain a phase adjusted communication signal.

14. The communications system of claim 10, wherein said second plurality of weight corrections are determined at said array control system by:
   identifying an actual fractional wavelength value ($f_{true}$) for at least a first receive signal of said plurality of receive signals;
   obtaining an estimated phase propagation ($n_{model}+f_{model}$) of said first receive signal traversing a distance relative to a reference location based on configuration data for said plurality of antenna elements;
   determining an actual differential distance ($z_{true}$) for said first antenna element relative to a reference location using said actual fractional wavelength value ($f_{true}$) and said estimated phase propagation ($n_{model}+f_{model}$); and
   estimating said second plurality of weight corrections based on the actual differential distance ($z_{true}$).

15. The communications system of claim 10, wherein said configuration data is updated by said array control system based on a plurality of relative phase center locations.

16. The communications system of claim 15, wherein said relative phase center locations are calculated at said array control system by:
   calculating a plurality of differential distance vectors for said plurality of antenna elements, each of the plurality of differential distance vectors associated with one of said plurality of receive signals; and
   computing said plurality of relative phase center locations using a system of equations describing the plurality of differential distance vectors.

17. The communications system of claim 10, wherein said array control system is further configured to:
   generate a first estimate of at least one first system parameter for said communication system using a computer simulation model and a plurality of model parameter values;
   generating a second estimate of said first system parameter using measured values for second system parameters of said communications system;
   compare said first estimate to said second estimate; and
   adjust said configuration data based on results of said comparing.

18. The communications system of claim 17, wherein said configuration data is adjusted at the antenna control system by updating said plurality of model parameter values to minimize a difference between said first and second estimates.

* * * * *